US 6,349,328 B1

(12) United States Patent
Haneda et al.

(10) Patent No.: US 6,349,328 B1
(45) Date of Patent: Feb. 19, 2002

(54) ELECTRONIC MAIL SYSTEM FOR SETTING ADDITIONAL STORAGE AREAS FOR SORTING SENT OR RECEIVED MAIL, AND MEDIUM STORING ELECTRONIC MAIL CONTROL PROGRAM

(75) Inventors: Isamu Haneda, Kyoto; Toshitaka Kaneda, Kashihara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/209,825

(22) Filed: Dec. 11, 1998

(30) Foreign Application Priority Data

Dec. 11, 1997 (JP) .............................................. 9-341256

(51) Int. Cl.[7] .............................................. G06F 13/00
(52) U.S. Cl. ........................ 709/206; 709/313; 709/329
(58) Field of Search .................... 709/206, 207, 709/219, 223, 224, 313, 328, 329

(56) References Cited

U.S. PATENT DOCUMENTS

| 5,377,354 A | * 12/1994 | Scannell et al. ............. 709/103 |
| 5,555,346 A | 9/1996 | Gross et al. |
| 5,596,697 A | 1/1997 | Foster et al. |
| 5,694,616 A | * 12/1997 | Johnson et al. .............. 709/207 |
| 5,812,770 A | * 9/1998 | Sakai .......................... 709/245 |
| 5,923,848 A | * 7/1999 | Goodhand et al. .......... 709/219 |
| 5,948,058 A | * 9/1999 | Kudoh et al. ................ 709/206 |
| 6,154,740 A | * 11/2000 | Shah .............................. 707/7 |

FOREIGN PATENT DOCUMENTS

| EP | 0413537 | 2/1991 |
| EP | 0420779 | 4/1991 |
| EP | 0597499 | 5/1994 |
| JP | 8194654 | 7/1996 |

OTHER PUBLICATIONS

Jim Craigie; ISO 10021–X. 400 (88) : A Tutorial for Those Familiar with X. 400 (84) ; Computer Networks & ISDN Systems; 1988, pp. 153–160.

* cited by examiner

Primary Examiner—Viet D. Vu

(57) ABSTRACT

An electronic mail system displays a list of received mails in a receiving mode. The list indicates a mark "O" at the end of the row describing the contents of the mail from a person for whom an already-read mail box has been set. When received mail is mail from a person for whom the already-read mail box has been set, the system displays TO MAIL BOX button further. When the user touches TO MAIL BOX button, the system stores the received mail currently displayed in the already-read mail box which has been set with the keyword of the mailing address.

19 Claims, 22 Drawing Sheets

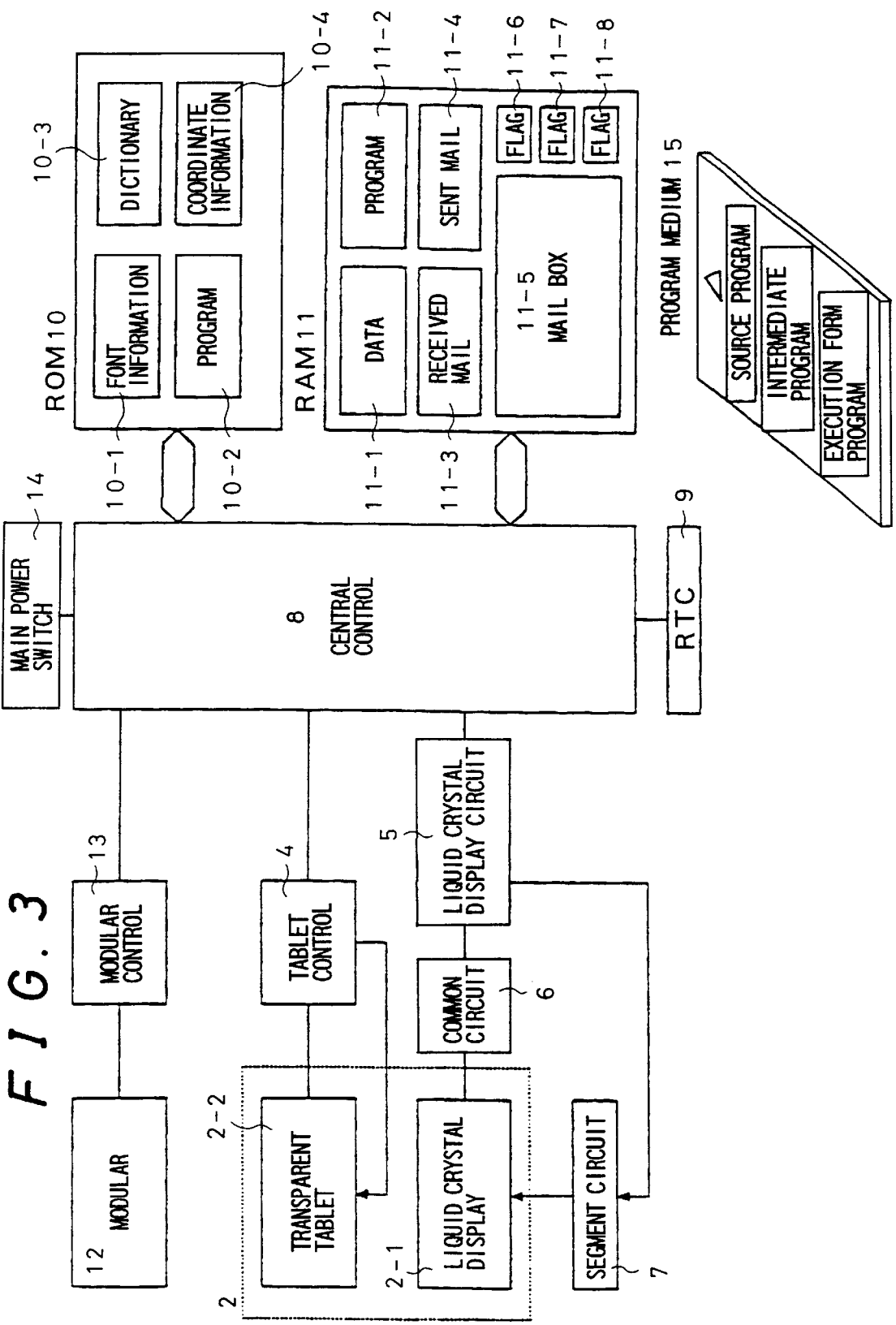

FIG. 4A

RECEIVING MAIL — 16

| ADDRESS | DATE OF ARRIVAL | OPEN | TITLE | BOX — 17 [RETURN] |
|---|---|---|---|---|
| yosio@strim.or.jp | 97.10.30 08:10 | OPENED | REQUESTING COOPERATION FOR QUESTIONNAIRE | |
| tanaka@vcp.bekkoame.or.jp | 97.11.04 14.25 | OPENED | DOCUMENT PREPARATION FOR MEETING | |
| inoue@lit.rd.mtt.jp | 97.11.06 11.50 | NOT OPENED | SCHEDULE OF PRELIMINARY ARRANGEMENT | ◯ |
| tanaka@vcp.bekkoame.or.jp | 97.11.06 13.42 | OPENED | REQUEST FOR CORRECTING DOCUMENTS FOR MEETING | |
| sato@agical.egg.or.jp | 97.11.07 20.05 | OPENED | YEAR-END PARTY | ◯ |

FIG. 4B

RECEIVING MAIL
18 — TITLE: SCHEDULE OF PRELIMINARY ARRANGEMENT
19 — From: inoue@lit.rd.mtt.jp

21 — REPLY   22 — TRANSFER   24 — RETURN
23 — TO BOX

From:    inoue@lit.rd.mtt.jp
Date:    Thu. 6 Nov 1997 11:50
To:      sato@pfs.osa.sharp.co.jp
Subject: SCHEDULE OF PRELIMINARY ARRANGEMENT HOW SHOULD WE SET THE SCHEDULE
OF THE NEXT PRELIMINARY ARRANGEMENT?
ANY TIME IN THE AFTERNOON OF NOV. 11
(TUESDAY) IS O.K. WITH US.  PLEASE LET
ME KNOW ABOUT YOUR CONVENIENCE.

20

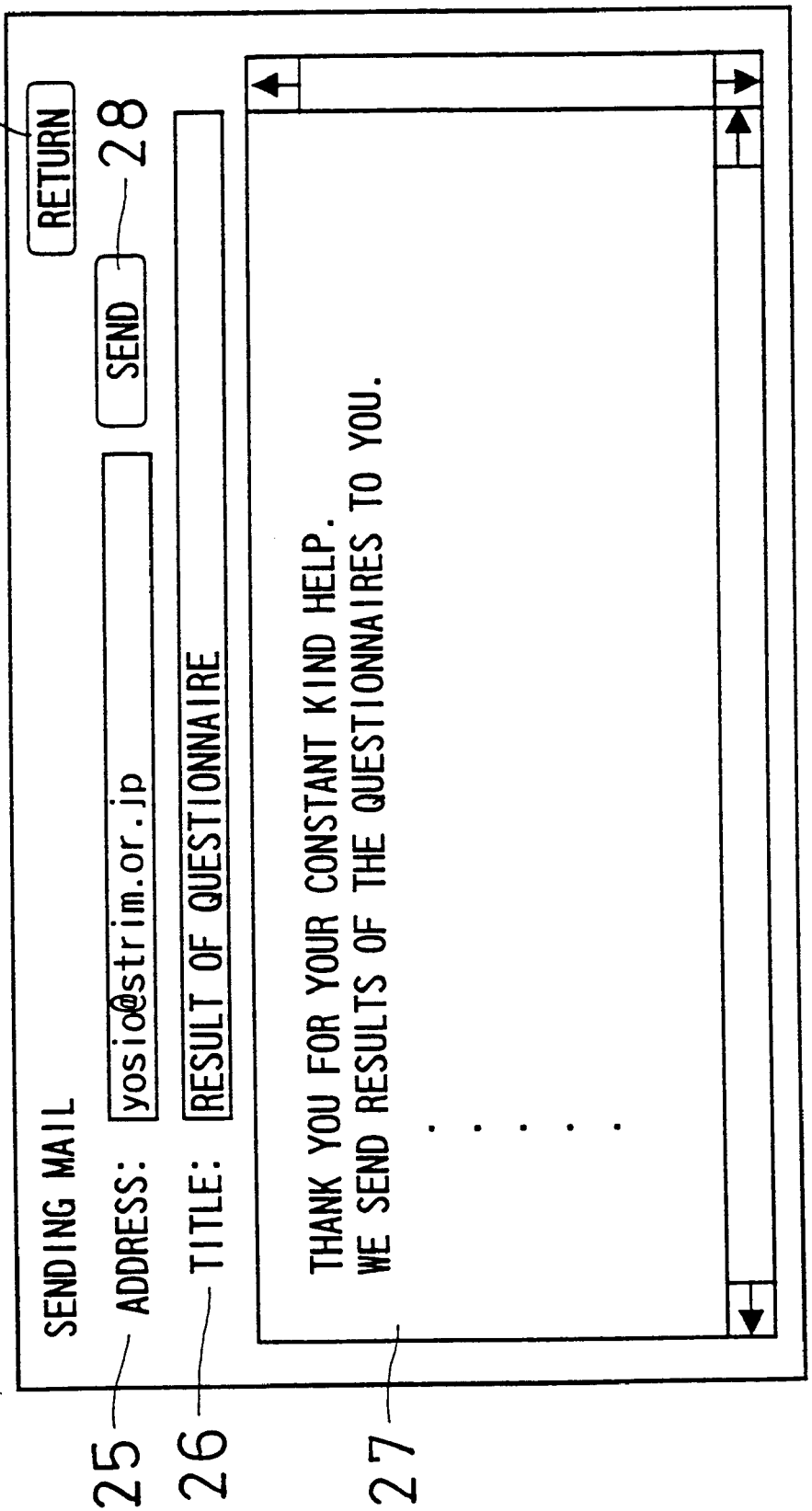

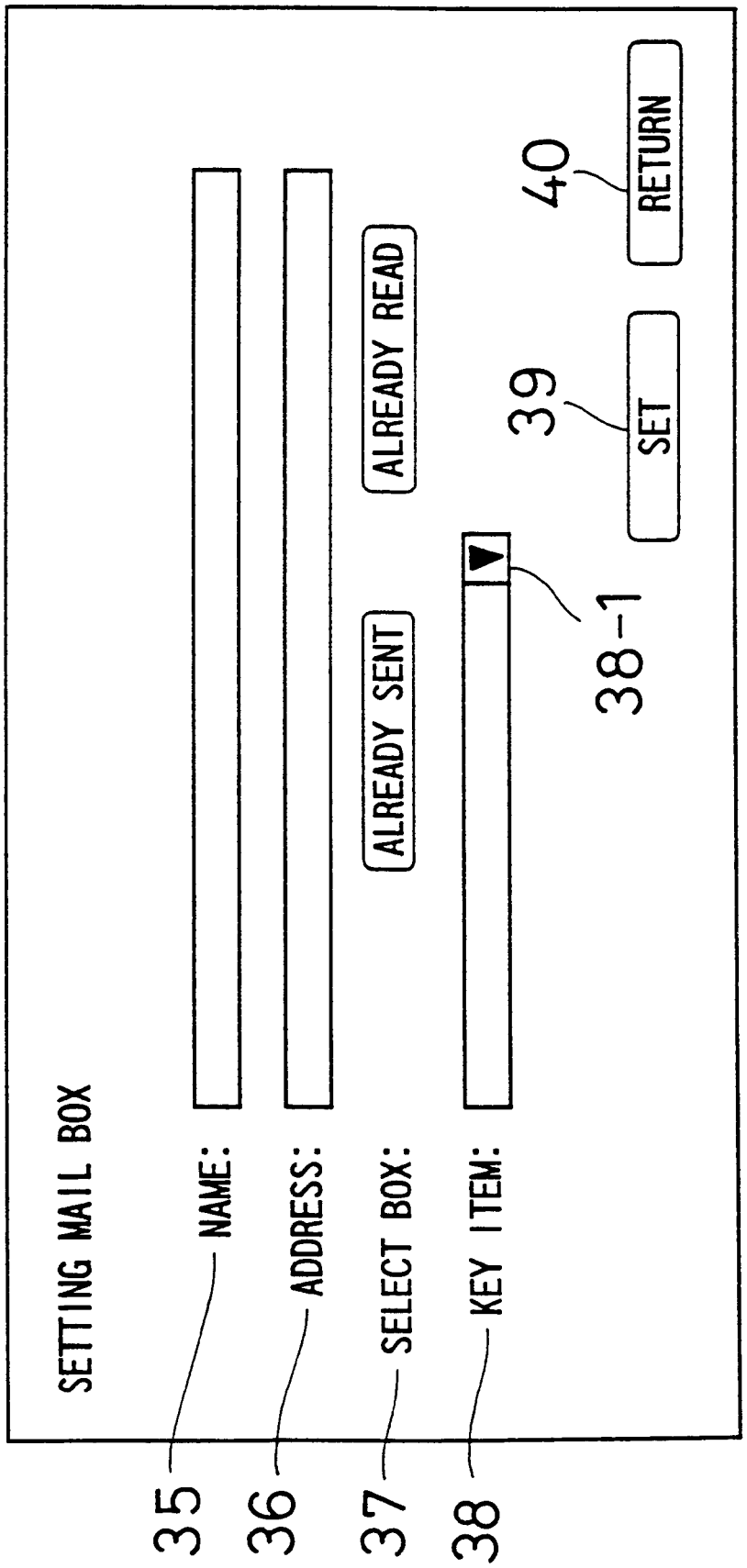

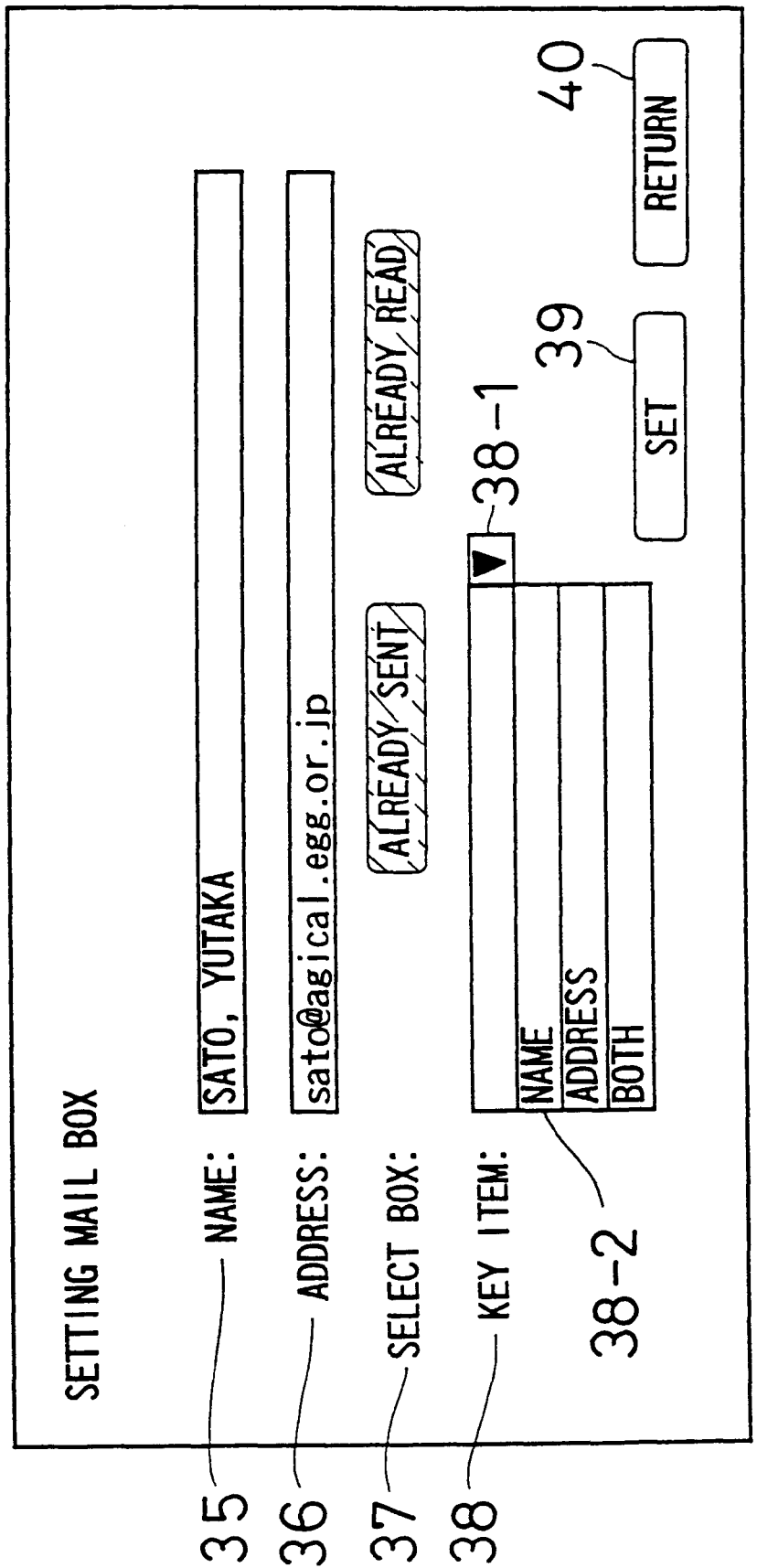

FIG. 8A

| MAIL BOX LIST | | MAIL BOX | |
|---|---|---|---|
| ADDRESS | NAME | | |
| inoue@lit.rd.mtt.jp | INOUE, MASARU | ALREADY-SENT MAIL | ALREADY-READ MAIL |
| yamada@ashi.sharp.co.jp | YAMADA, ICHIRO | ALREADY-SENT MAIL | ALREADY-READ MAIL |
| sato@agical.egg.or.jp | SATO, YUTAKA | ALREADY-SENT MAIL | ALREADY-READ MAIL |
| tanaka@vcp.bekkoame.or.jp | TANAKA, SHIN-ICHI | ALREADY-SENT MAIL | ALREADY-READ MAIL |
| | | | |
| | | | |

RETURN 42

| ALREADY-SENT | MAIL BOX | | | | |
|---|---|---|---|---|---|

NAME: TANAKA, SHIN-ICHI
ADDRESS: tanaka@vcp.bekkoame.or.jp

| TITLE | SIZE | DATE OF ARRIVAL | ANNEX | REPLY |
|---|---|---|---|---|
| PROCEEDINGS (97/8/20, PLANNING MEETING) | 2 | 97/08/24 09:45 | NOT PROVIDED | |
| REFERENCE MATERIAL: NEXT PRELIMINARY ARRANGEMENT | 3 | 97/09/06 16:12 | PROVIDED | DONE |
| DOCUMENT PREPARATION FOR MEETING | 2 | 97/10/14 14:30 | NOT PROVIDED | |
| REQUEST FOR CORRECTING DOCUMENTS FOR MEETING | 3 | 97/11/06 13:42 | NOT PROVIDED | DONE |

RETURN  43

ELECTRONIC MAIL SYSTEM FOR SETTING ADDITIONAL STORAGE AREAS FOR SORTING SENT OR RECEIVED MAIL, AND MEDIUM STORING ELECTRONIC MAIL CONTROL PROGRAM

BACKGROUND OF THE INVENTION

1. Field of the Invention

The present invention relates to an electronic mail system for sending/receiving an electronic mail via communication lines and a computer readable recording medium storing an electronic mail control program.

2. Description of Related Art

As a conventional electronic mail system, there has been one which allows to readily discriminate a sender of a mail by mail receiving means for receiving a mail and for sorting the received mail by address to store in a box of recording means and by sender managing means for sorting the mail sorted by address further by sender in the box as disclosed in Japanese Unexamined Patent Publication JP-A 8-194654 (1996).

However, the above-mentioned conventional electronic mail system has a problem in that, since it only distributes all of the received mails to file boxes by sender, the user has to sort the mails again after confirming the contents thereof when the user wants to sort only mails which need to be kept among the already-read received mails and already-sent mails.

Further, the above-mentioned conventional electronic mail system has had another problem in that, because there exist the file boxes of all of the received mails by sender, it is difficult to set a mail box for keeping only mails from a specific person or to set a mail box for pigeonholing mails sent by that person.

SUMMARY OF THE INVENTION

Accordingly, it is an object of the present invention to provide an electronic mail system capable of readily sorting electronic mails.

The invention provides an electronic mail system comprising mail creating means for creating a mail; mail sending means for sending the created mail; mail receiving means for receiving a mail; mail displaying means for displaying the received mail; already-sent mail storage means for storing already-sent mails; received mail storage means for storing received mails; setting means for setting a first storage area for storing already-sent mails within the already-sent mail storage means by name or address or a second storage area for storing already-read received mails within the received mail storage means by name or address; instructing means for instructing to store the already-sent mail or the already-read received mail in the first or the second storage area set by the setting means; and storage means for storing the already-sent mail or the already-read received mail in the first or the second storage area in response to the instruction of the instructing means.

According to the invention, the electronic mail system can store the already-sent mail or the already-read received mail in the storage area by setting the storage area by name or address and by exchanging the mail with the person of the name or the address. Thereby, the electronic mail system allows to readily sort the electronic mails which need to be kept.

The invention provides an electronic mail system comprising mail creating means for creating a mail; mail sending means for sending the created mail; mail receiving means for receiving a mail; mail displaying means for displaying the received mail; already-sent mail storage means for storing already-sent mails; received mail storage means for storing received mails; setting means for setting a first storage area for storing already-sent mails within the already-sent mail storage means by name or address or a second storage area for storing already-read received mails within the received mail storage means by name or address; and storage means for automatically storing the already-sent mails among all of the created mails or the already-read mails among received mails in the first or second storage area set by the setting means.

According to the invention, the electronic mail system can set the storage area by name or address and automatically store such mails among all the already-sent mails or the already-read received mails that have storage areas for destination names or addresses, by name or address in the storage areas. Thereby, the electronic mail system allows to readily sort the electronic mails.

In the invention it is preferable that the electronic mail system further comprises area display means for indicating that there exists the storage area for storing the already-sent mail by name or address set by the setting means or the storage area for storing the already-read received mail by name or address.

According to the invention, the electronic mail system displays data which indicates that the storage area set by the setting means exists. Thereby, the user of the electronic mail system can readily recognize whether or not the storage area has been set.

In the invention it is preferable that the electronic mail system further comprises additional setting means for setting a third storage area for storing already-sent mails by name or address with respect to the names or addresses of the already-read received mails stored in the second storage area and a fourth storage area for storing already-read received mails by name or address with respect to the names or addresses of the already-sent mails stored in the first storage area, within the already-sent mail storage means and the received mail storage means, respectively, and the first through fourth storage areas set in the past are held.

According to the invention, the electronic mail system can hold the storage areas set in the past as they are without changing them in setting the additional storage area.

The invention provides a computer readable medium storing an electronic mail control program for causing a computer to control sending/receiving of mails, the computer comprising already-sent mail storage means for storing already-sent mails, and received mail storage means for storing received mails, the electronic mail control program causing the computer to perform a process for creating a mail, a process for sending the created mail, a process for receiving a mail, a process for displaying the received mail, a process for setting a first storage area for storing already-sent mails within the already-sent mail storage means by name or address or a second storage area for storing already-read received mails within the received mail storage means by name or address, a process for instructing to store the already-sent mail in the first storage area or the already-read received mail in the second storage area, and a process for storing the already-sent mail in the first storage area or the already-read mail in the second storage area, in response to the above-mentioned instruction.

According to the fifth invention, the electronic mail control program within the medium causes the computer to perform the above-mentioned processes when it is installed and executed in the computer. As a result, the computer realizes mail creating means for creating a mail, mail receiving means for receiving a mail, mail displaying means for displaying the received mail, already-sent mail storage means for storing already-sent mails, received mail storage means for storing received mails, setting means for setting a first or second storage area by name or address, instructing means for instructing to store the mail, and storage means for storing the already-sent mail or the already-read received mail in the first or the second storage area. Thereby, the computer can store the already-sent mail or the already-read received mail in the storage area by setting the storage area by name or address and by exchanging the mail with the person of the name or the address. Accordingly, the electronic mail system permits readily sorting the electronic mails which need to be kept.

The invention provides a computer readable medium storing an electronic mail control program for causing a computer to control mail sending/receiving of mails, the computer comprising already-sent mail storage means for storing already-sent mails, and received mail storage means for storing received mails, the electronic mail control program causing the computer to perform a process for creating a mail; a process for sending the created mail, a process for receiving a mail, a process for displaying the received mail, a process for setting a first storage area for storing already-sent mails within the already-sent mail storage means by name or address or a second storage area for storing already-read received mails within the received mail storage means by name or address, and a process for automatically storing the already-sent mails among the created mails in the first storage area or the already-read mails among the received mails in the second storage area.

According to the invention, the electronic mail control program within the medium causes the computer to perform the above-mentioned processes when it is installed and executed in the computer. As a result, the computer realizes mail creating means for creating a mail, mail sending means for sending the created mail, mail receiving means for receiving a mail, mail displaying means for displaying the received mail, already-sent mail storage means for storing already-sent mails, received mail storage means for storing received mails, setting means for setting a first or second storage area by name or by address, and storage means for automatically storing the already-sent mails among the created mails or the already-read mails among the received mails or already-read received mails in the storage area by setting the storage area by name or address. Thereby, the computer permits readily sorting the electronic mails. Thereby, the computer allows to readily sort the electronic mails.

The invention provides an electronic mail system comprising a mail creating circuit for creating a mail; a mail sending unit for sending the created mail; a mail receiving unit for receiving a mail; a mail displaying unit for displaying the received mail; an already-sent mail storage unit for storing already-sent mails; a received mail storage unit for storing received mails; a setting circuit for setting a first storage area for storing already-sent mails within the already-sent mail storage unit by name or address or a second storage area for storing already-read received mails within the received mail storage unit by name or address; an instructing circuit for instructing to store the already-sent mail in the first storage area or the already-read received mail in the second storage area which areas are set by the setting circuit; and a storage circuit for storing the already-sent mail in the first storage area or the already-read mail in the second storage area, in response to the instruction of the instructing circuit.

The invention provides an electronic mail system comprising a mail creating circuit for creating a mail; a mail sending unit for sending the created mail; a mail receiving unit for receiving a mail; a mail displaying unit for displaying the received mail; an already-sent mail storage unit for storing already-sent mails; a received mail storage unit for storing received mails; a setting circuit for setting a first storage area for storing already-sent mails within the already-sent mail storage unit by name or address or a second storage area for storing already-read received mails within the received mail storage unit by name or address; and a storage circuit for automatically storing the already-sent mails among all of the created mails or the already-read mails among the received mails in the first or second storage area set by the setting circuit.

According to the invention, the above-mentioned electronic mail system permits readily sorting the electronic mails.

BRIEF DESCRIPTION OF THE DRAWINGS

Other and further objects, features, and advantages of the invention will be more explicit from the following detailed description taken with reference to the drawings wherein:

FIG. 3 is a block diagram showing the whole structure of the information processor in FIG. 1;

FIGS. 4A and 4B show screens on a display in the information processor of FIG. 1 in receiving a mail;

FIGS. 5A and 5B show screens on the display in the information processor of FIG. 1 in sending a mail;

FIGS. 7A and 7B show screens on the display in the information processor of FIG. 1 in setting the mail box;

FIGS. 8A and 8B show screens on the display in the information processor of FIG. 1 in reading the mail box;

DETAILED DESCRIPTION OF THE PREFERRED EMBODIMENTS

Figure 1:
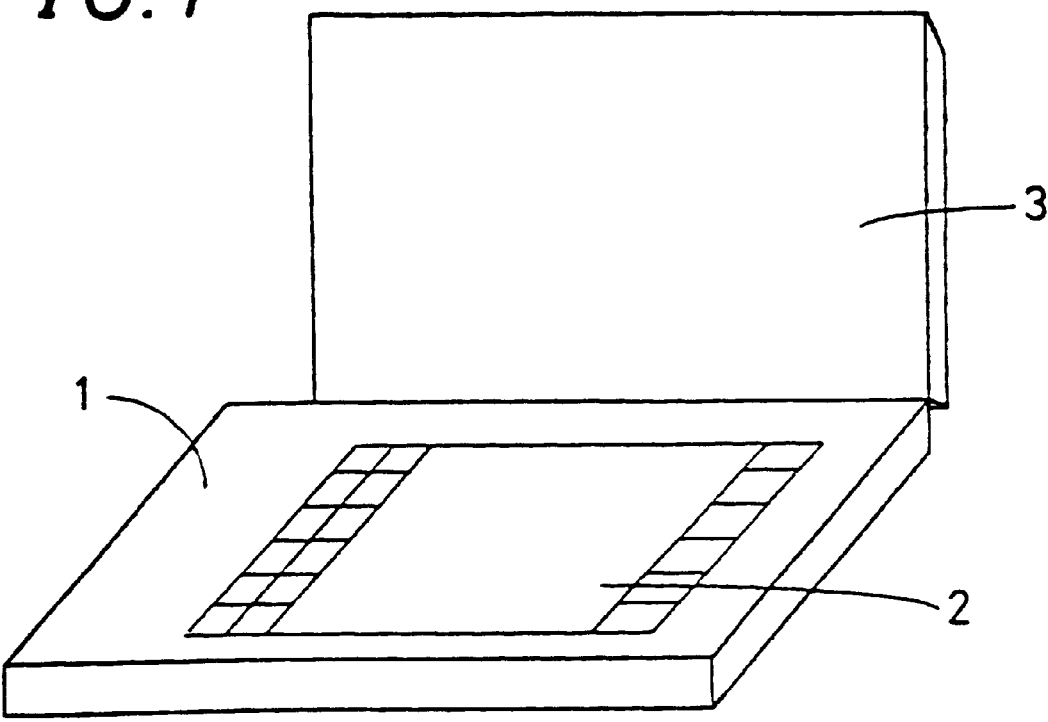
FIG. 1 is a perspective view of an appearance of an information processor containing an electronic mail processing system of a first embodiment of the invention.

Now referring to the drawings, preferred embodiments of the invention are described below.

FIG. 1 is a perspective view of an appearance of an information processor containing an electronic mail processing system of a first embodiment of the present invention. In FIG. 1, the information processor comprises a main cabinet section 1, an input/output section 2 and a cover section 3. The main cabinet section 1 comprises the input/output section 2, an infrared communication section, a pen holding section and others and contains a power supply section and others therein. The power supply section supplies power source to necessary parts such as a control circuits for controlling the input/output section 2, the infrared communication section, an interface and others. The input/output section 2 will be explained later in detail based on FIG. 2. The cover section 3 is connected to the back of the main cabinet section 1 by hinges and turns so as to cover the input/output section 2, thus playing a role of protecting the input/output section 2 in carrying the information processor.

Figure 2:
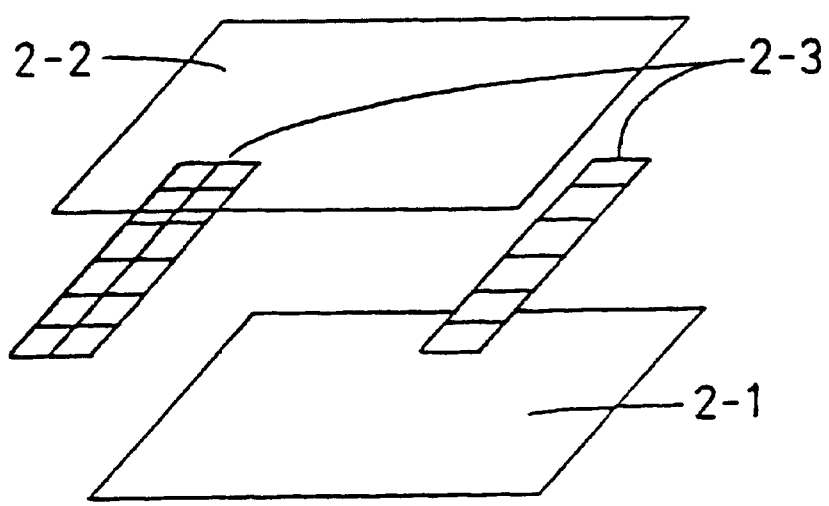
FIG. 2 is an exploded perspective view of an input/output section in the information processor in FIG. 1.

FIG. 2 is an exploded perspective view of the input/output section 2. In FIG. 2, the input/output section 2 comprises a liquid crystal display section 2-1, a transparent tablet section 2-2 and films 2–3. The liquid crystal display section 2-1 is a thin display of a matrix type capable of displaying characters. It is noted that a back-light comprising an EL panel and the like may be provided on the back as necessary.

The transparent tablet section 2-2 has the size for covering the liquid crystal display section 2-1. The transparent tablet section 2-2 is constructed by providing transparent electrodes on the inner sides of two transparent sheets, respectively, and by printing small projecting spacers orderly on the inner sides so that the electrodes do not contact each other in the normal state for example. When the user specifies a position on the transparent tablet section 2-2 by pressing it by a finger or a pen, the two transparent electrodes contact each other, so that it is possible to detect the contact position.

The films 2–3 indicate fixed keys used in instructing an execution of a function of the information processor. They are inserted between the liquid crystal display section 2-1 and the transparent tablet section 2-2. Frequently used functions of the information processor are printed thereon by comprehensive symbols. It is also possible to detect the position on the liquid crystal display section 2-1 selected by the user by synchronizing the display contents displayed on the liquid crystal display section 2-1 and positional information detected on the transparent tablet section 2-2.

FIG. 3 is a block diagram showing the whole structure of the information processor in which the present invention is adopted. Explanation of the liquid crystal display section 2-1 and the transparent tablet section 2-2 will be omitted here because they have been described above.

A tablet control section 4 takes out coordinate information from the transparent tablet section 2-2. It is connected to the transparent tablet section 2-2 by the transparent electrodes provided on the respective transparent sheets and detects the coordinates of the position specified by the finger or the pen based on the contact of both transparent electrodes. A liquid crystal display circuit section 5 stores dot positions for lighting the liquid crystal display as a bit map and sends signals to a common circuit 6 and a segment circuit 7 as necessary. A central control section 8 controls input and output information by various commands. An RTC 9 counts time based on clock signals from an oscillator to output the current time and date.

An ROM 10 has a font information area 10-1 for storing fonts of characters displayed on the liquid crystal display section 2-1, a program area 10-2 for storing a program indicating operations of the central control section 8, a dictionary area 10-3 for storing a dictionary for translating characters and a coordinate information area 10-4 for storing coordinate transforming information for transforming coordinates detected by the tablet control section 4 into coordinates corresponding to the display position.

An RAM 11 has a data storage section 11-1 for storing various data such as texts and graphics inputted by the user through the input/output section 2, a program storage section 11-2 for holding a program in a program medium 15 when the program medium 15 is installed to the main body by using program reading means not shown, a received mail storage section 11-3 for storing received mails, an already-sent mail storage section 11-4 for storing mails which have been sent, a mail box memory 11-5 for storing already-read received mails and already-sent mails by name or address, a mail box processing flag 11-6 indicative of a type of a mail box process, an already-sent update flag 11-7 indicative of whether or not setting of the already-sent mail box has been updated and an already-read update flag 11-8 indicative of whether or not setting of the already-read mail box has been updated.

The mail box memory 11-5 has also an already-sent mail box flag 11-5-1 indicative of whether or not the already-sent mail box for storing already-sent mails exists, an already-read mail box flag 11-5-2 indicative of whether or not the already-read mail box for storing already-read received mails exists, a key item memory 11-5-3 indicative of an item which turns out to be a keyword for storing a mail in the corresponding mail box, a key content memory 11-5-4 for storing the keyword for storing the mail in the corresponding mail box, an already-read mail memory 11-5-5 for storing the already-read received mail to be stored in the already-read mail box and an already-sent mail memory 11-5-6 for storing an already-sent mail to be stored in the already-sent mail box.

A modular section 12 is connected with a communication line and sends/receives electronic mails and inputs/outputs data to/from Internet via a modular control section 13. A main body power switch 14 is a switch for turning on/off the power supply of the main body.

The program medium 15 is a recording medium created separably from the main body 1, such as a CD-ROM, a floppy disk and an IC card. An execution form program read into the main body 1 to be executed, a source program which allows to configure the execution form program and an intermediate program are recorded in the program medium 15. It is noted that when the programs are not installed in the main cabinet section 1 in advance, the respective programs and data necessary for functioning the present invention are read from the program medium 15 by using program reader. Then, the data is stored in the data storage section 11-1 of the RAM 11 and the program codes of the executed program are stored in the program storage section 11-2 of the RAM 11.

Operations performed by the user in receiving and sending a mail will be explained at first by using FIGS. 4A and 4B and FIGS. 5A and 5B. FIGS. 4A and 4B show screens on a display in receiving a mail. When a mode of the information processor is set at an electronic mail receiving mail, a list of received mails is displayed on the liquid crystal display section 2-1 as shown in FIG. 4A. When the user touches RETURN button 16 here, the display returns the screen to a screen displayed on the display before the electronic mail receiving mode has been set.

In the received mail list in FIG. 4A, mailing addresses of respective mails, time and date when the mails have arrived, an item indicating whether they have been opened or not and titles of the mails are listed in a table form. Further, a mark "O" is marked in a mail box column 17 at the end of the row describing data concerning on each mail when the mail is a mail from a person for whom an already-read mail box is set.

When the user touches the row describing data concerning the received mail whose mailing address is "inoue@lit.rd.mtt.jp" by a pen for example, the display image of the row of the specified received mail displayed on the display is inverted as shown in FIG. 4A and after the inversion, the detail of the specified received mail is displayed on the liquid crystal display section 2-1 as shown in FIG. 4B. Here, the title of the received mail is displayed in a title displaying section 18, the electronic mailing address of the sender is displayed in a sender displaying section 19 and the contents of the received mail is displayed in a content displaying section 20. REPLY button 21 for replying to the sender and TRANSFER button 22 for transferring the received mail to a third party are also displayed in the screen. When the mark "O" is marked in the mail box column 17 in the row of the touched received mail, indicating that it is a mail from a person for whom the already-read mail box has been set, TO MAIL BOX button 23 is also displayed as shown in FIG. 4B.

TO MAIL BOX button 23 is a button for instructing the information processor to store the received mail currently displayed to the already-read mail box set in correspondence to the mailing address "inoue@lit.rd.mtt.jp" . When the user touches RETURN button 24 in the state of FIG. 4B, the screen on the display is returned to a screen of a list of the received mails in FIG. 4A.

Figure 5B:
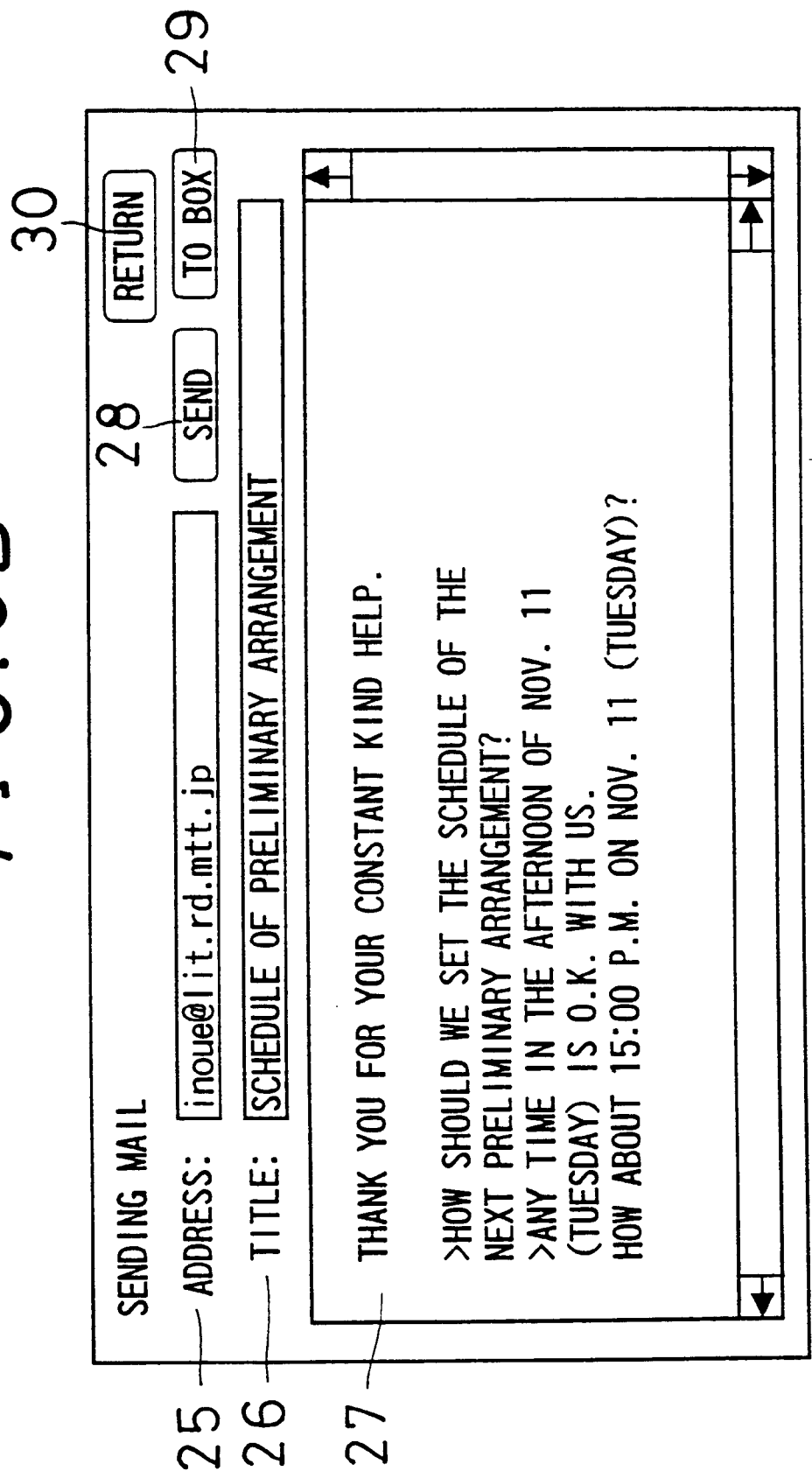

FIGS. 5A and 5B show screens displayed on the display in sending a mail. The user creates an electronic mail to be sent by using the screen of FIG. 5A in sending the mail.

At first, the user inputs a mailing address to which the mail is to be sent to an address input section 25. When the mailing address is inputted, the information processor compares this mailing address with mailing addresses for which mail boxes have been set and when there is a mail box having the coincident address, displays TO MAIL BOX button 29 as shown in FIG. 5B. When there is no mail box whose address coincides, no TO MAIL BOX button 29 is displayed as shown in FIG. 5A.

Next, the user inputs the title of the mail to a title inputting section 26 and the contents of the mail to be sent to a content inputting section 27. When the user touches SEND button 28, the information processor stores various information thus inputted to the sending mail storage section 11-4 of the RAM 11 and sends the mail to the mailing address inputted to the address inputting section 25.

When the user touches TO MAIL BOX button 29 further, the information processor stores the mail thus sent to the already-sent mail box set in correspondence to the mail address "inoue@lit.rd.mtt.jp". When the user touches RETURN button 30, the inputted values are canceled and the display returns the screen to the screen displayed on the display before the mail to be sent has been created.

Next, the mail box operations of the present invention will be explained by using FIGS. 6 through 8.

Figure 6:
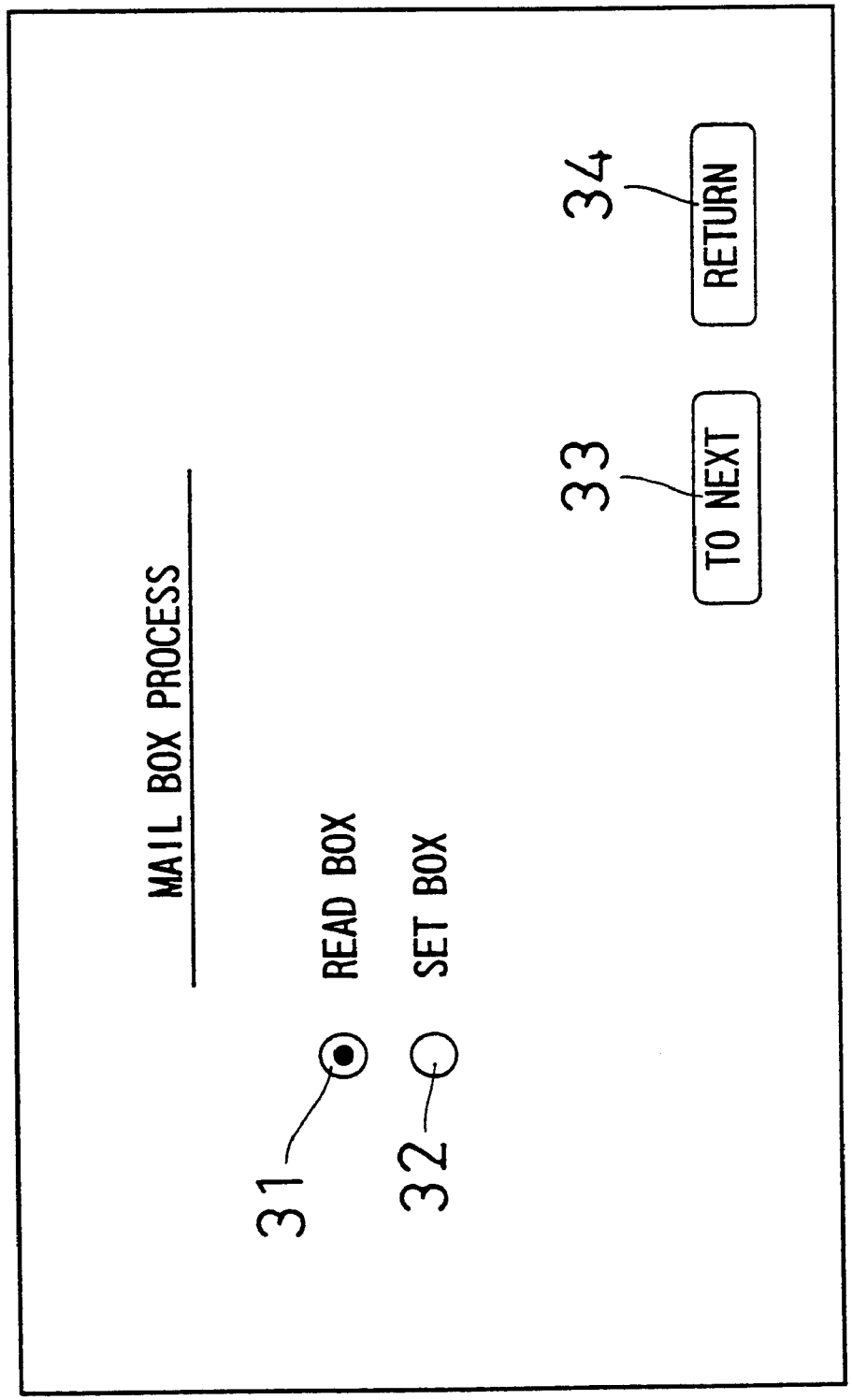
FIG. 6 shows an initial screen for performing operations in a mail box on the display in the information processor of FIG. 1.

When the user specifies the mail box process by using menu means not shown, an initial screen for the mail box process appears as shown in FIG. 6. The user can see the contents of the mail box by touching a radio button 31 of READ MAIL BOX to put a check mark and then by touching NEXT button 33. Thereby, a screen of READ MAIL BOX shown in FIG. 8A appears. The user can set a mail box corresponding to a person or a mailing address anew by touching a radio button 32 of SET MAIL BOX to put a check mark and then by touching NEXT button 33. Thereby, a screen of SET MAIL BOX shown in FIG. 7A appears. When the user touches RETURN button 34, the check mark as putted as described above is canceled and the screen returns the screen to that displayed before the mail box processing has been performed.

FIGS. 7A and 7B are the display screens displayed in setting the mail box. SET MAIL BOX screen in FIG. 7A appears when the user touches the radio button 32 of SET MAIL BOX and then NEXT button 33 in the state shown in FIG. 6. Here, the user inputs a mailing address to be set in a mailing address inputting section 36 and a name corresponding to the mailing address to a name inputting section 35.

The information processor compares the inputted mailing address and name with mailing addresses and names in mail boxes already set and when there is a mail box whose mailing address and name are coincident, displays the preset contents of the mail box. It is noted that the information processor is arranged such that although it is possible to set a mail box additionally when a mailing address whose mail box has been already set is inputted, a mail box once set cannot be changed. When there is no same mailing address nor same name with the inputted mailing address and name in the mail boxes already set, respective buttons of a mail box selecting section 37 are put in the non-selective state and a key item inputting section 38 is blanked. The mail box selecting section 37 is provided to select a mail box to be set between a mail box for storing already-sent mails and a mail box for storing already-read mails. Either one mail box or both mail boxes may be selected in case of FIG. 7A. The user can select the type of the mail box by touching the button corresponding to the mail box to be selected.

The touched button within the mail box selecting section 37 is inverted as shown in FIG. 7B and is put into the selected state. The inverted display may be released and the selection be released by touching the button being selected again.

The key item inputting section 38 is provided to select whether the criterion for judging a mail to be stored in the mail box should be by name or by address. When the user touches an arrow key 38-1 in the key item inputting section 38, the information processor displays a list box 38-2 as shown in FIG. 7B to allow to select any one item among three items of Name, Mail Address and Both. An item specified by the user among all of the items within the list box 38-2 is displayed in the key item inputting section 38.

A process for setting a mail box corresponding to a person, Mr. SATO, Yutaka for example, whose mail box is not set yet will be explained below. At first, the user inputs as SATO, Yutaka to the name inputting section 35 and as "sato@agical.egg.or.jp" to the mailing address inputting section 36.

Next, the user specifies and inverts the both already-sent and already-read buttons within the mail box selecting section 37. Then, the user selects Both in the list box 38-2 in the key item inputting section 38 and touches SET button 39. As a result, already-sent and already-read mail boxes for storing already-sent mails sent to Mr. SATO, Yutaka and already-read mails received from Mr. SATO, Yutaka are set with the keywords of the name and address. Thereafter, already-sent mails and received and already read mails whose name is SATO, Yutaka or whose mailing address is "sato@agical.egg.or.jp" are stored in the already-sent and already-read mail boxes.

FIGS. 8A and 8B are the display screens displayed in reading the mail box. When the user selects READ MAIL BOX in the display of the initial screen in FIG. 6 and touches TO NEXT button 33, READ MAIL BOX screen is displayed as shown in FIG. 8A. READ MAIL BOX screen shows the mailing address and name of persons whose mail box has been set and the type of the mail box corresponding to the person. When the user touches RETURN button 42, the information processor closes the screen of FIG. 8A and returns the screen to the initial screen in FIG. 6. When the user touches the row 41 of Mr. TANAKA, Shin-ichi for example, the detailed contents of the mail box of the person, i.e., Mr. TANAKA, Shin-ichi, described in the touched row appears as shown in FIG. 8B. Because the mail box already set corresponding to Mr. TANAKA, Shin-ichi is only the already-sent mail box as shown in the example in FIG. 8A, the information processor displays the mail box indicated as ALREADY SENT at the upper right corner of the screen in the example of FIG. 8B. When the user touches RETURN button 43 here, the information processor closes the screen of FIG. 8B and returns the screen to the screen of FIG. 8A.

Figure 9:
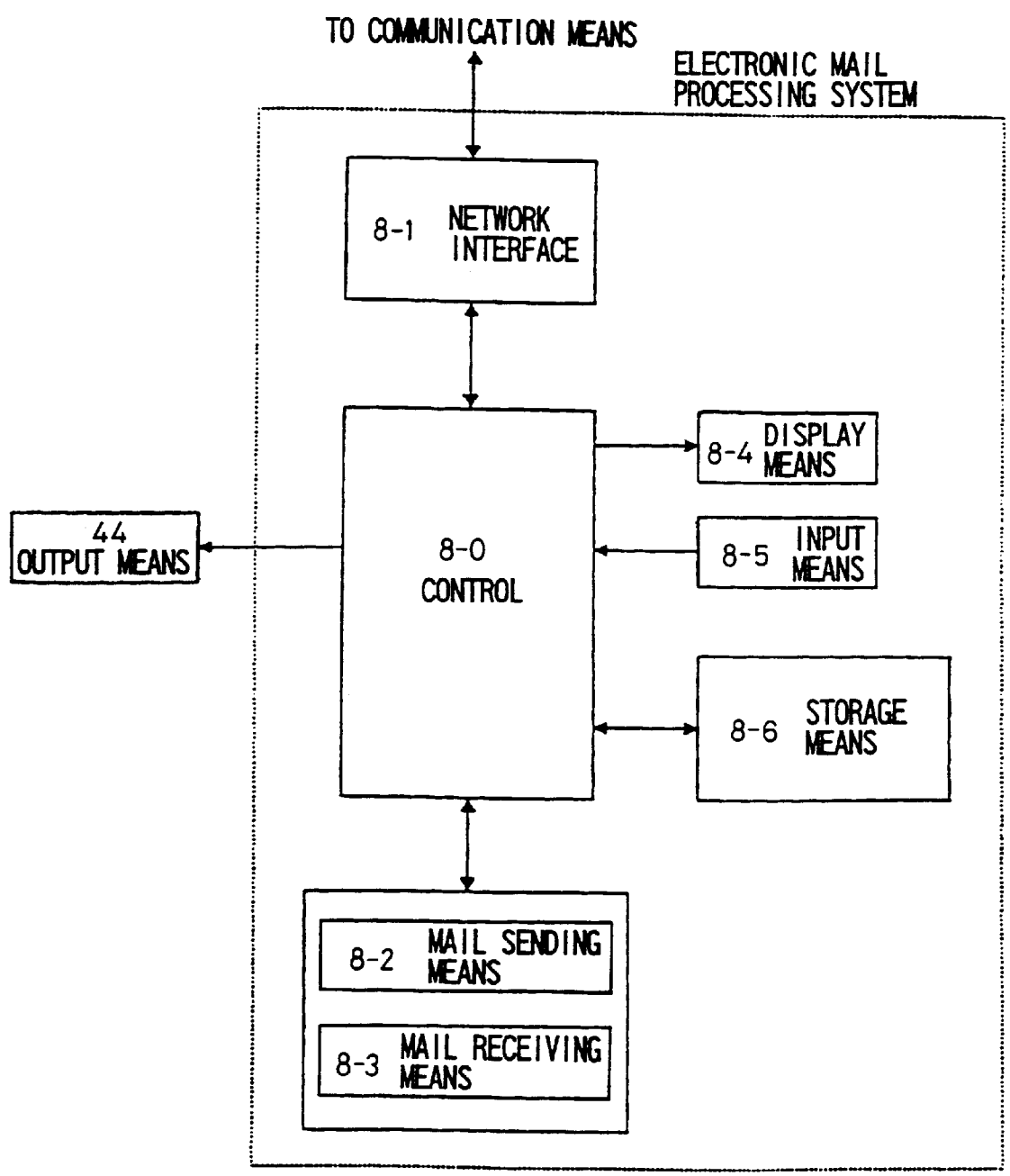
FIG. 9 is a processing block diagram of the electronic mail processing system within the information processor of FIG. 1.

The above-mentioned operation will be explained by using a functional processing block diagram of the electronic mail processing system in FIG. 9. As components of the electronic mail processing system, the central control section 8 comprises a network interface 8-1 for conducting network communication, mail sender 8-2 for sending a mail to a specified address, mail receiver 8-3 for receiving a mail and for sorting the received mail by address to store in the received mail storage section 11-3 of the RAM 11 a control section 8-0 having the overall control of the electronic mail processing system, display 84 for controlling the liquid crystal display circuit section 5 for driving the liquid crystal display section 2-1 shown in FIG. 2, inputting device 8-5 for controlling the tablet control section 4 for controlling the transparent tablet section 2-2 shown in FIG. 3 and storage device 8-6 for storing the received mail in the RAM 11.

The electronic mail system stores the received mail in the received mail storage section 11-3 of the RAM 11 once and is capable of reading the mail from the received mail storage section 11-3 to output by using output means 44 comprising a laser printer or the like as necessary. The electronic mail processing system of the receiving side, i.e., of the destination side, receives a mail sent from an arbitrary system via the network interface 8-1 and sorts an stores it by address by the mail receiver 8-3 in an area assured within the RAM 11 by the storage device 8-6.

When the user specifies TO MAIL BOX button 23 by the inputting device 8-5 in the state where the received mail display screen is displayed, the mail received by the mail receiver 8-3 is stored within the already-read mail memory 11-5-5 in the mail box memory 11-5 of the RAM 11 assured by the storage device 8-6.

When the user specifies TO MAIL BOX button 29 by the inputting device 8-5 in the state where the received mail display screen is displayed, the mail sent by the mail sender 8-2 is stored within the already-sent mail memory 11-5-6 in the mail box memory 11-5 of the RAM 11 assured by the storage device 8-6.

Next, the above-mentioned operations and actions will be explained in detail by using flowcharts shown in FIGS. 10 through 13.

Figure 10:
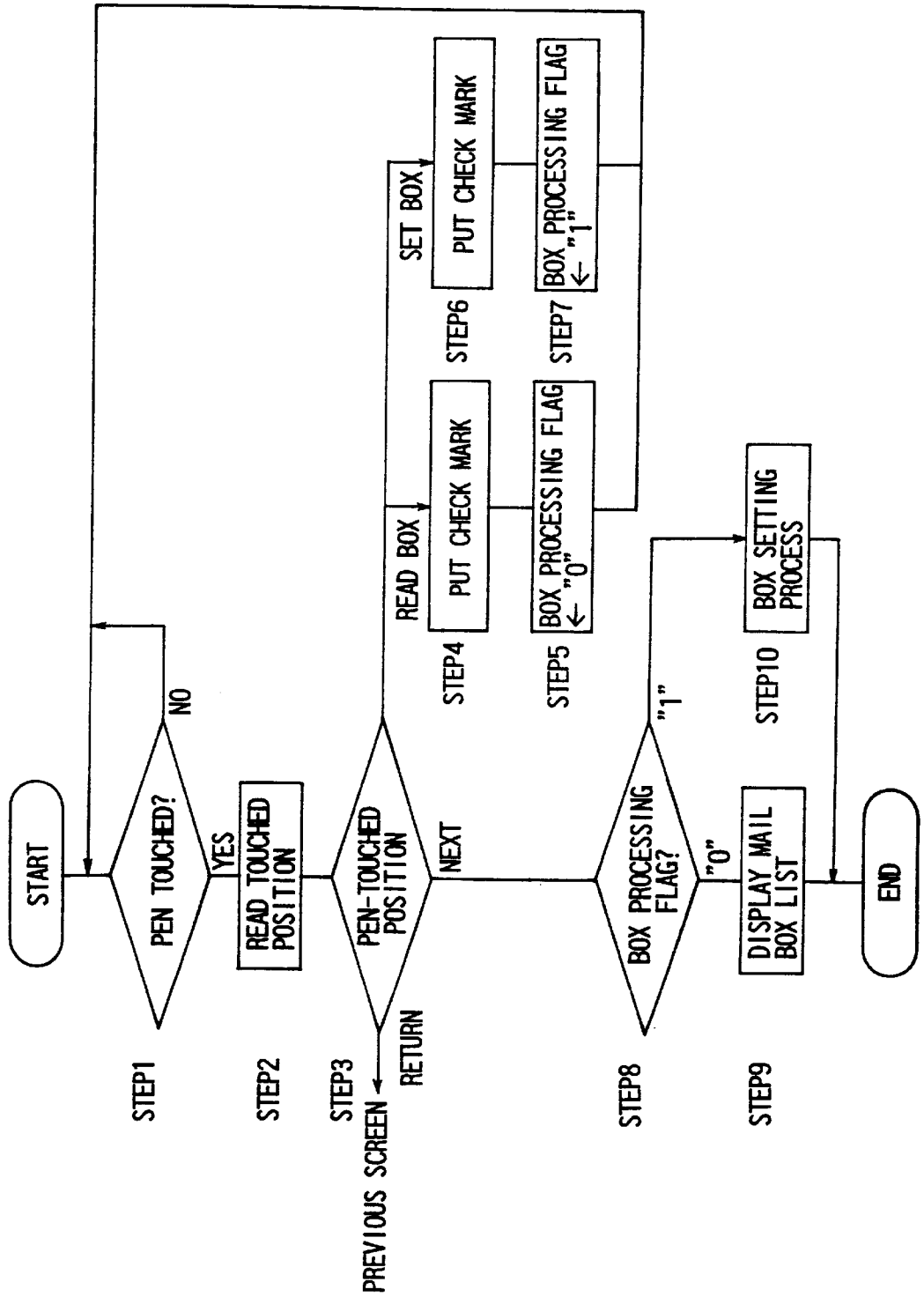
FIG. 10 is a flowchart showing an initial screen process of the mail box operations within the information processor of FIG. 1.

FIG. 10 is a flowchart showing the initial screen process in the mail box operations within the information processor. At first, the information processor waits until the input/output section 2 is touched by a pen in step 1 in the state where the mail box initial screen is displayed. When the user touches the input/output section 2 by the pen, the information processor reads the touched position in step 2 and judges the pen-touched position within the display screen in step 3. When the pen-touched position is RETURN button 34, the information processor returns the screen to the screen displayed before the initial screen of the mail box has been displayed. When the pen-touched position is READ MAIL BOX radio button 31, the information processor puts the check mark to the radio button 31 in step 4 and sets "0" to the mail box processing flag 11-6 of the RAM 11 in step 5. Then, the information processor returns the process to step 1. When the pen-touched position is SET MAIL BOX radio button 32, the information processor puts the check mark to the radio button 32 in step 6 and sets "1" to the mail box processing flag 11-6 of the RAM 11 in step 7. Then, the information processor returns the process to step 1.

When the pen-touched position is TO NEXT button 33, the information processor judges the value of the mail box processing flag 11-6 of the RAM 11 in step 8. When the value of the mail box processing flag 11-6 is "0", the information processor displays MAIL BOX LIST screen shown in FIG. 8A in step 9 and ends the process. When the value of the mail box processing flag 11-6 is "1", the information processor performs the mail box setting process as explained by using FIGS. 7A and 7B and ends the process.

It is noted that the mail box setting process explained by using FIGS. 7A and 7B will be explained below in detail by using FIGS. 11 through 13.

Figure 11:
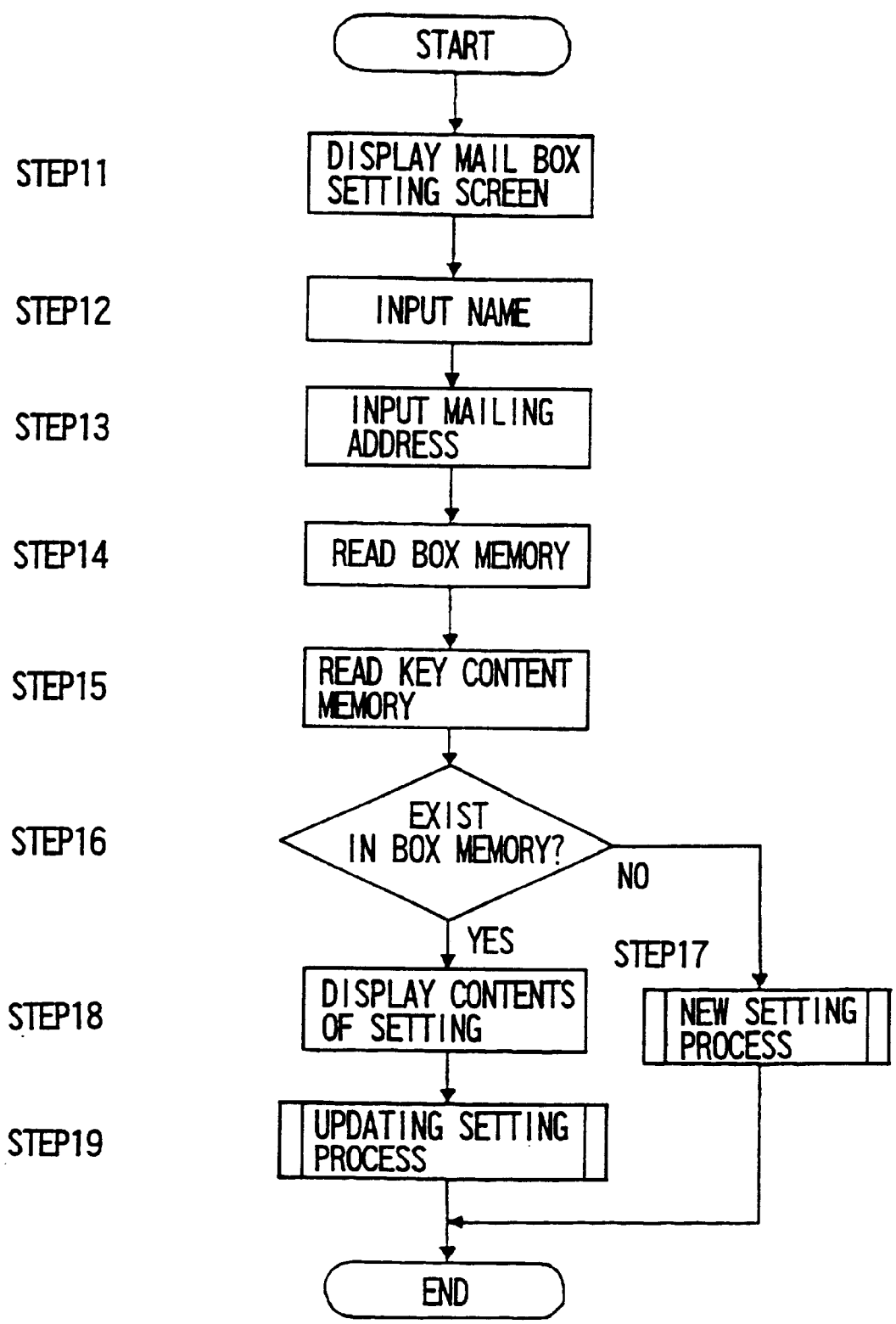
FIG. 11 is a flowchart showing a main process in an operation for setting the mail box within the information processor of FIG. 1.

FIG. 11 is a flowchart showing the main process in the operation for setting the mail box of the information processor. At first, the information processor displays the mail box setting screen shown in FIG. 7A in step 11. Next, it lets the user input a name in the name inputting section 35 in step 12 and a mailing address in the mailing address inputting section 36 in step 13.

The information processor reads the contents of the mail box memory 11-5 from the RAM 11 in step 14 and reads the contents of the key content memory 11-5-4 from the contents of the mail box memory 11-5 in step 15.

It then compares the inputted name and mailing address with the contents of the key content memory 11-5-4 read in step 15 to judge whether or not at least one of the inputted name and mailing address exists as a keyword within the mail box memory 11-5 in step 16. When the inputted name and mailing address do not exist within the mail box memory 11-5, the information processor performs a new setting process (described later) shown in FIG. 12 for creating a mail box to be created in correspondence to the person on the opposite side of the communication indicated by the name and mailing address and ends the process in step 17. When the inputted name and mailing address exist within the mail box memory 11-5, the information processor displays the contents of setting of the mail box corresponding to the existing name and mailing address in step 18 and performs a setting updating process (described later) shown in FIG. 13 for updating the mail box to be updated in correspondence to the person on the opposite side of the communication indicated by the name and mailing address and ends the process.

Figure 12:
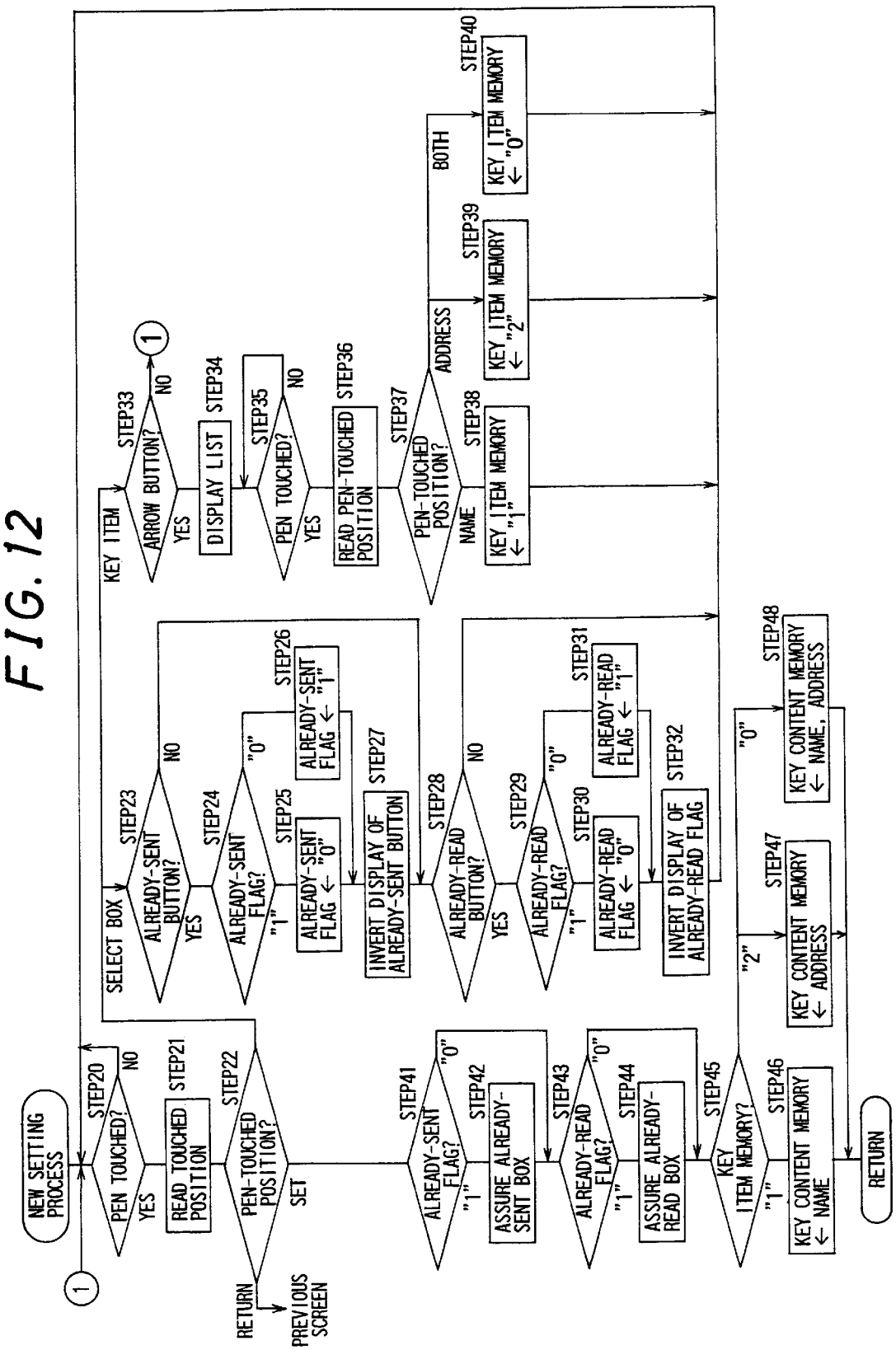
FIG. 12 is a flowchart showing a new setting process of the operation for setting the mail box within the information processor of FIG. 1.

FIG. 12 is a flowchart showing the new setting process of the operation for setting the mail box.

When the process starts in the state where the screen for setting the mail box in FIG. 7A is displayed, the information processor waits until the input/output section 2 is touched by the pen in step 20. When the user touches the input/output section 2 by the pen, the information processor reads the touched position in step 21 and judges the pen-touched position within the display screen in step 22. When the pen-touched position is RETURN button 40, the information processor returns the screen to the screen displayed before the SET MAIL BOX screen has been displayed.

When the pen-touched position is the mail box selecting section 37, the information processor judges whether or not the ALREADY SENT button has been touched in step 23. When the pen-touched position is not ALREADY SENT button, the process advances to step 28. When ALREADY SENT button has been touched, the information processor judges the value of the already-sent mail box flag 11-5-1 for the mail box to be created having the keyword of the name or the mailing address currently being displayed within the mail box memory 11-5 of the RAM 11 in step 24. When the value of the already-sent mail box flag 11-5-1 is "1", the information processor sets "0" to the already-sent mail box flag 11-5-1 in step 25 and advances to step 27. When the value of the already-sent mail box flag 11-5-1 is "0", the information processor sets "1" to the already-sent mail box flag 11-5-1 in step 26 and advances to step 27. The information processor inverts the display state of ALREADY SENT button from the current state in step 27.

Next, the information processor judges whether or not ALREADY READ button has been touched in step 28. When ALREADY READ button has not been touched, the process returns to step 20. When ALREADY READ button has been touched on the other hand, the information processor judges the value of the already-read mail box flag 11-5-2 for the mail box to be created within the mail box memory 11-5 of the RAM 11 in step 29. When the value of the already-read mail box flag 11-5-2 is "1", the information processor sets "0" to the already-read mail box flag 11-5-2 in step 30 and advances to step 32. When the value of the already-read mail box flag 11-5-2 is "0", the information processor sets "1" to the already-read mail box flag 11-5-2 in step 31 and advances to step 32. In step 32, the information processor inverts the display state of ALREADY SENT button from the current state and returns the process to step 20.

When the pen-touched position is the key item inputting section 38 in step 22, the information processor judges whether or not the arrow button 38-1 has been touched in step 33. When the arrow button 38-1 has not been touched, the process returns to step 20. When the arrow button 38-1 has been touched, the information processor displays the list box 38-2 in step 34.

In step 35, the information processor waits until the input/output section 2 is touched by the pen. When the pen touches the input/output section 2, the information processor reads the touched position in step 36 and judges the pen-touched position within the display screen in step 37. When the pen-touched position is the column of Name within the list box 38-2, the information processor sets "1" in the key item memory 11-5-3 within the mail box memory 11-5 in the RAM 11 in step 38 and returns the process to step 20. When the pen-touched position is the column of Mail Address within the list box 38-2, the information processor sets "2" in the key item memory 11-5-3 within the mail box memory 11-5 in the RAM 11 in step 39 and returns the process to step 20. When the pen-touched position is the column of Both within the list box 38-2, the information processor sets "0" in the key item memory 11-5-3 within the mail box memory 11-5 in the RAM 11 in step 40 and returns the process to step 20.

When the pen-touched position is the SET button 39 in the judgment in step 22, the information processor judges the value of the already-sent mail box flag 11-5-1 for the mail box to be created within the mail box memory 11-5 in the RAM 11 in step 41. When the value of the already-sent mail box flag 11-5-1 is "0", the information processor advances to step 43. When the value of the already-sent mail box flag 11-5-1 is "1", the information processor advances to step 42 to assure an area for the already-sent mail box corresponding to the person on the opposite side of the communication indicated by the mail box setting screen being displayed within the already-sent mail memory 11-5-6.

Next, the information processor judges the value of the already-read mail box flag 11-5-2 for the mail box to be created within the mail box memory 11-5 in the RAM 11 in step 43. When the value of the already-read mail box flag 11-5-2 is "0", the information processor advances to step 45. When the value of the already-read mail box flag 11-5-2 is "1", the information processor advances to step 45 to assure an area for the already-read mail box corresponding to the person on the opposite side of the communication within the already-read mail memory 11-5-5 in step 44.

In step 45, the information processor judges the value of the key item memory 11-5-3 within the mail box memory 11-5 of the RAM 11. When the value of the key item memory 11-5-3 is "1", the information processor stores the name inputted in the key content memory 11-5-4 in step 46 and ends the new setting process. When the value of the key item memory 11-5-3 is "2", the information processor stores the mailing address inputted in the key content memory 11-5-4 in step 47 and ends the new setting process. When the value of the key item memory 11-5-3 is "0", the information processor stores the name and the mailing address inputted in the key content memory 11-5-4 in step 48 and ends the new setting process.

Figure 13:
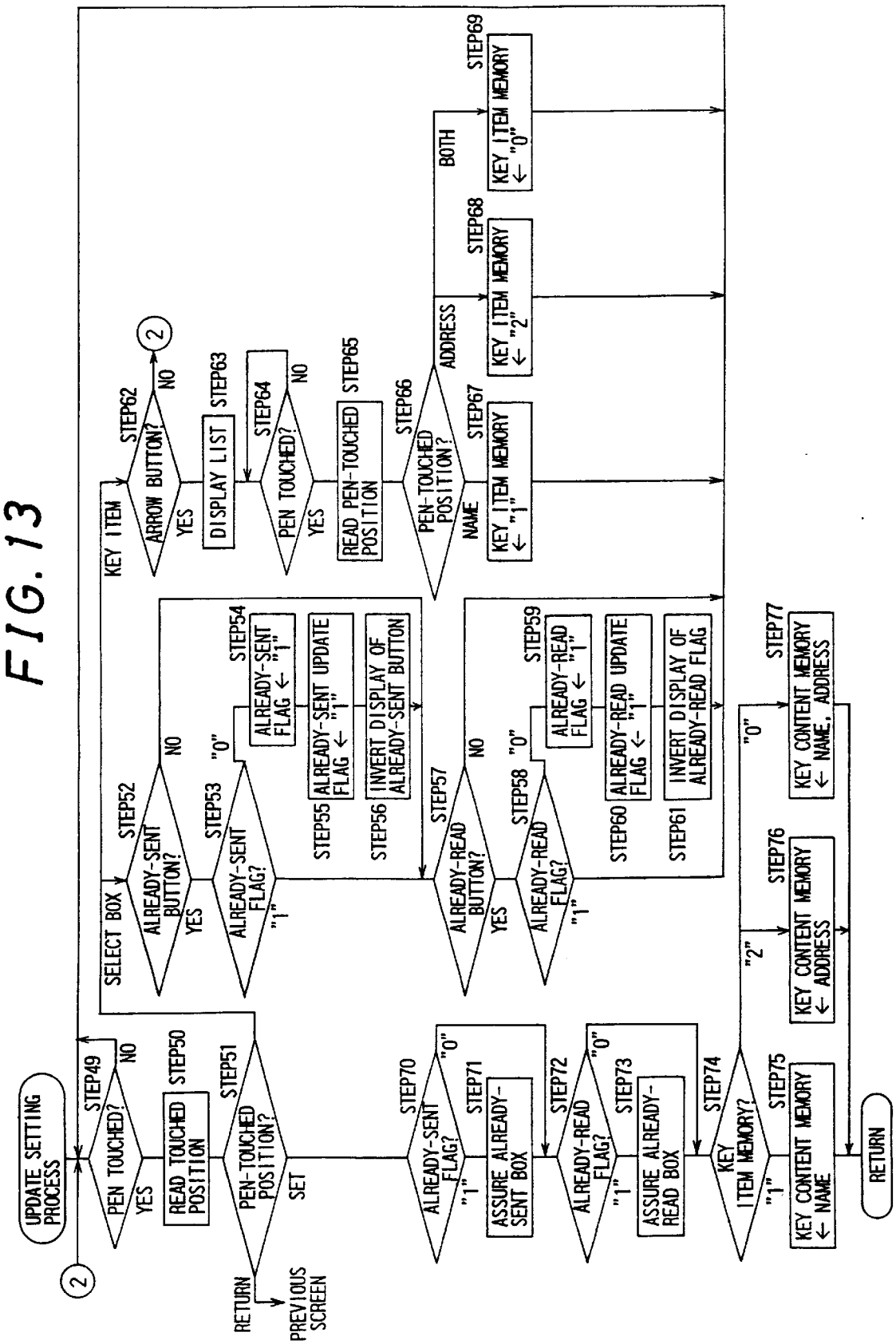
FIG. 13 is a flowchart showing an update setting process of the operation for setting the mail box within the information processor of FIG. 1.

FIG. 13 is a flowchart showing the update setting process of the operation for setting the mail box within the information processor.

In the state where the screen for setting the mail box in FIG. 7A is displayed, the information processor waits until the input/output section 2 is touched by the pen in step 49. When the user touches the input/output section 2 by the pen, the information processor reads the touched position in step 50 and judges the pen-touched position within the display screen in step 51. When the pen-touched position is RETURN button 40, the information processor returns the screen to the screen displayed before the SET MAIL BOX screen has been displayed.

When the pen-touched position is the mail box selecting section 37, the information processor judges whether or not ALREADY SENT button has been touched in step 52. When the pen-touched position is not ALREADY SENT button, the process advances to step 57. When ALREADY SENT button has been touched, the information processor judges the value of the already-sent mail box flag 11-5-1 for the mail box to be updated having the keyword of at least the name or the mailing address of the person on the opposite side of the communication currently being displayed within the mail box memory 11-5 of the RAM 11 in step 53. When the value of the already-sent mail box flag 11-5-1 is "1", the information processor advances the process to step 57. When the value of the already-sent mail box flag 11-5-1 is "0", the information processor sets "1" to the already-sent mail box flag 11-5-1 in step 54, sets "1" to the already-sent update flag 11-7 and inverts the display state of ALREADY SENT button in step 56.

Next, the information processor judges whether or not ALREADY READ button has been touched in step 57. When ALREADY READ button has not been touched, the process returns to step 49. When ALREADY READ button has been touched on the other hand, the information processor judges the value of the already-read mail box flag 11-5-2 for the mail box to be updated within the mail box memory 11-5 of the RAM 11 in step 58. When the value of the already-read mail box flag 11-5-2 is "1", the information processor returns the process to step 49. When the value of the already-read mail box flag 11-5-2 is "0", the information processor sets "1" to the already-read mail box flag 11-5-2 in step 59, sets "1" to the already-sent update flag 11-7 in step 60 and inverts the display state of ALREADY READ button in step 61.

When the pen-touched position is the key item inputting section 38 in step 51, the information processor judges whether or not the arrow button 38-1 has been touched in step 62. When the arrow button 38-1 has not been touched, the process returns to step 49. When the arrow button 38-1 has been touched, the information processor displays the list box 38-2 in step 63.

In step 64, the information processor waits until the input/output section 2 is touched by the pen. When the pen touches the input/output section 2, the information processor reads the touched position in step 65 and judges the pen-touched position within the display screen in step 66. When the pen-touched position is the column of Name within the list box 38-2, the information processor sets "1" in the key item memory 11-5-3 within the mail box memory 11-5 in the RAM 11 in step 67 and returns the process to step 49. When the pen-touched position is the column of Mail Address within the list box 38-2, the information processor sets "2" in the key item memory 11-5-3 within the mail box memory 11-5 in the RAM 11 in step 68 and returns the process to step 49. When the pen-touched position is the column of Both within the list box 38-2, the information processor sets "0" in the key item memory 11-5-3 within the mail box memory 11-5 in the RAM 11 in step 69 and returns the process to step 49.

When the pen-touched position is the SET button 39 in the judgment in step 51, the information processor judges the value of the already-sent update flag 11-7 of the RAM 11 in step 70. When the value of the already-sent update flag 11-7 is "0", the information processor advances to step 72. When the value of the already-sent update flag 11-7 is "1", the information processor advances to step 71 to assure an area for the already-sent mail box corresponding to the person on the opposite side of the communication indicated by the mail box setting screen currently being displayed within the already-sent mail memory 11-5-6.

Next, the information processor judges the value of an already-read update flag 11-8 of the mail box memory 11-5 in the RAM 11 in step 72. When the value of the already-read update flag 11-8 is "0", the information processor advances to step 74. When the value of the already-read update flag 11-8 is "1", the information processor advances to step 73 to assure an area for the already-read mail box corresponding to the person on the opposite side of the communication within the already-read mail memory 11-5-5 in step 73.

In step 74, the information processor judges the value of the key item memory 11-5-3 within the mail box memory 11-5 of the RAM 11. When the value of the key item memory 11-5-3 is "1", the information processor stores the name inputted in the key content memory 11-5-4 in step 75 and ends the update setting process. When the value of the key item memory 11-5-3 is "2", the information processor stores the mailing address inputted in the key content memory 11-5-4 in step 76 and ends the update setting process. When the value of the key item memory 11-5-3 is "0", the information processor stores the name and the mailing address inputted in the key content memory 11-5-4 in step 77 and ends the update setting process.

Figure 14:
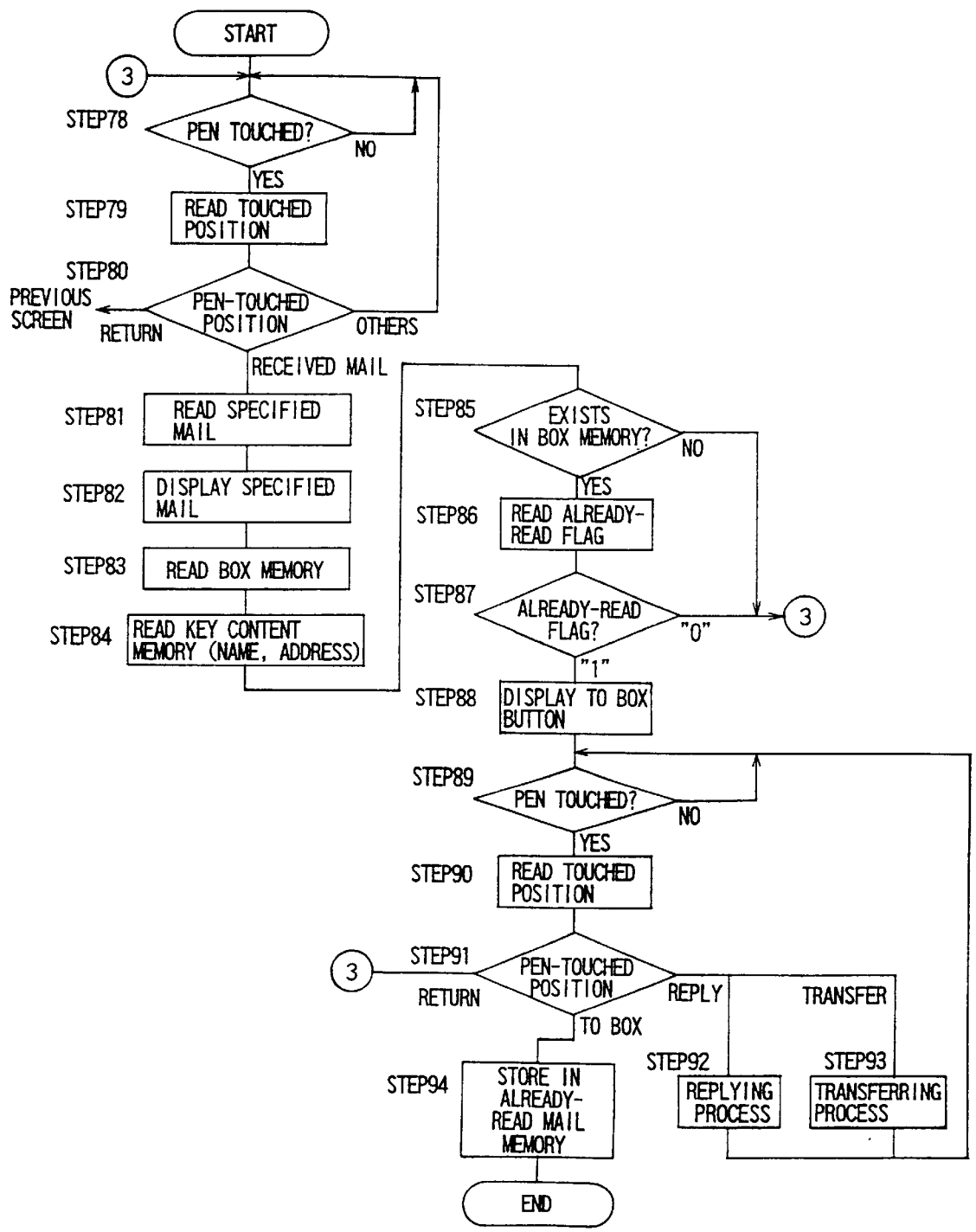
FIG. 14 is a flowchart showing a process of the information processor of FIG. 1 in receiving a mail.

Next, the process of the information processor in receiving a mail will be explained by using a flowchart in FIG. 14.

In the state in which the screen of the mail list is displayed, the information processor waits until the user touches the input/output section 2 by the pen in step 78. When the pen touches the input/output section 2, the information processor reads the touched position in step 79 and judges the pen-touched position with in the display screen in step 80. When the pen-touched position is RETURN button 16, the information processor returns the screen to that displayed before the mail receiving screen has been displayed. When the pen-touched position is any one row within the rows of the listed received mails, the information processor reads the received mail of the specified row from the received mail storage section 11-3 of the RAM 11 in step 81. Then, it displays the received mail read in step 81 as shown in FIG. 4B in step 82.

The information processor reads the contents of the mail box memory 11-5 from the RAM 11 in step 83 and reads the contents of the key content memory 11-5-4 from the read contents of the mail box memory 11-5 in step 84. In step 85, it compares the name and mailing address of the sender of the received mail currently displayed with the contents of the key content memory 11-5-4 read in step 84 to judge whether or not the sender of the received mail exists within the mail box memory 11-5.

When the sender of the received mail does not exist within the mail box memory 11-5, the information processor returns the process to step 78. When the sender of the received mail exists within the mail box memory 11-5, the information processor reads the already-read mail box flag 11-5-2 for the mail box having a keyword of at least the name or the mailing address of the sender in step 86. It then judges the value of the already-read mail box flag 11-5-2 in step 87. When the value of the already-read mail box flag 11-5-2 is "0", the information processor returns the process to step 78 and when the value of the already-read mail box flag 11-5-2 is "1", the information processor displays the TO MAIL BOX button 23 in step 88.

Next, the information processor waits until the user touches the input/output section 2 by the pen in step 89. When the pen touches the input/output section 2, the information processor reads the touched position in step 90 and judges the pen-touched position in step 91. When the pen-touched position is RETURN button 24, the information processor returns the display screen to that in FIG. 4A. When the pen-touched position is TO MAIL BOX button 23, the information processor stores the received mail in an area of the mail box having a keyword of at least the name or the mailing address of the above-mentioned address within the already-read mail memory 11-5-5 in the mail box memory 11-5 of the RAM 11 in step 94 and then ends the process. When the pen-touched position is REPLY button 21, the information processor performs the replying process in step 92 and ends the process. When the pen-touched position is TRANSFER button 22, the information processor performs the transferring process in step 93 and ends the process.

Figure 15:
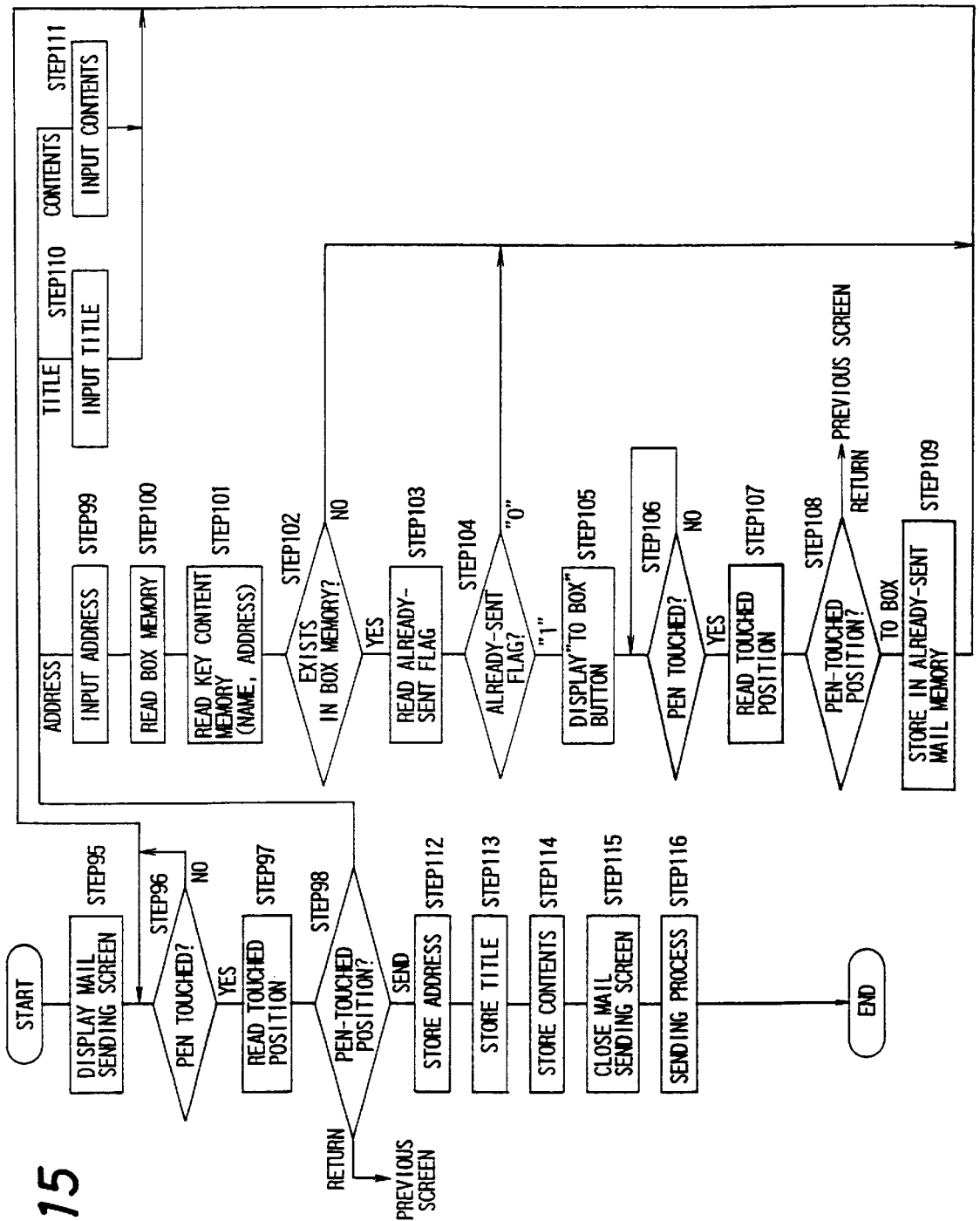
FIG. 15 is a flowchart showing a process of the information processor of FIG. 1 in sending a mail.

Next, the process of the information processor in sending a mail will be explained by using a flowchart shown in FIG. 15. At first, the information processor displays the mail sending screen in FIG. 5A in step 95 and waits until the user touches the input/output section 2 by the pen in step 96. When the pen touches the input/output section 2, the information processor reads the touched position in step 97 and judges the pen-touched position within the display screen in step 98. When the pen-touched position is RETURN button 30, the information processor returns the screen to that displayed before the mail sending screen has been displayed.

When the pen-touched position is the address inputting section 25 and the mailing address is inputted as the address in step 99, the information processor reads the contents of the mail box memory 11-5 from the RAM 11 in step 100 and reads the contents of the key content memory 11-5-4 from the read contents of the mail box memory 11-5 in step 101. Instep 102, it compares the inputted name and mailing address of the mail to be sent with the contents of the key content memory 11-5-4 read in step 101 to judge whether or not the address of the mail to be sent exists within the mail box memory 11-5. When the address to the mail to be sent does not exist within the mail box memory 11-5, the information processor returns the process to step 96. When the address of the mail to be sent exists within the mail box memory 11-5, the information processor reads the already-sent mail box flag 11-5-1 for the mail box having a keyword of the mailing address in step 103. It then judges the value of the already-sent mail box flag 11-5-1 in step 104. When the value of the already-sent mail box flag 11-5-1 is "0", the information processor returns the process to step 96 and when the value of the already-sent mail box flag 11-5-1 is "1", the information processor displays the TO MAIL BOX button 29 in step 105.

Next, the information processor waits until the user touches the input/output section 2 by the pen in step 106. When the pen touches the input/output section 2, the information processor reads the touched position in step 107 and judges the pen-touched position in step 108. When the pen-touched position is RETURN button 30, the information processor returns the mail sending screen to the previous screen. When the pen-touched position is TO MAIL BOX button 29, the information processor stores the mail to be sent in an area of the mail box having a keyword of at least the name or the mailing address of the above-mentioned sending address within the already-sent mail memory 11-5-6 in the mail box memory 11-5 of the RAM 11 in step 109 and then returns the process to step 96.

When the pen-touched position is the title inputting section 26 in the judgment in step 98 and then the title is inputted in step 110, the process returns to step 96. When the pen-touched position is the content inputting section 27 and then the contents to be sent is inputted in step 111, the process returns to step 96. When the pen-touched position is SEND button 28, the information processor stores the address in step 112, stores the title in step 113 and stores the contents of the mail in step 114. It then closes the mail sending screen in step 115, performs the sending process in step 116 and then ends the process.

The above-mentioned processes allow the already-sent mail or the already-read mail to be stored in the mail box by name or by address and the existence of the mail box to be indicated.

An information processor containing an electronic mail processing system of a second embodiment of the present invention will be explained below based on FIGS. 16 through 19. Because the structure of the information processor of the second embodiment is identical with that of the information processor of the first embodiment, the same reference numerals refer to the same parts and their explanation will be omitted here. At first, operations in receiving and sending a mail in the present invention will be explained by using FIGS. 16 and 17. However, an explanation of the operation of each screen in the information processor of the second embodiment which is the same with that of the first embodiment will be omitted here. That is, the initial screen process and the mail box setting process in the operation of the mail box in the information processor of the second embodiment are equal to those shown in FIGS. 10, and 11 through 13.

Figure 16:
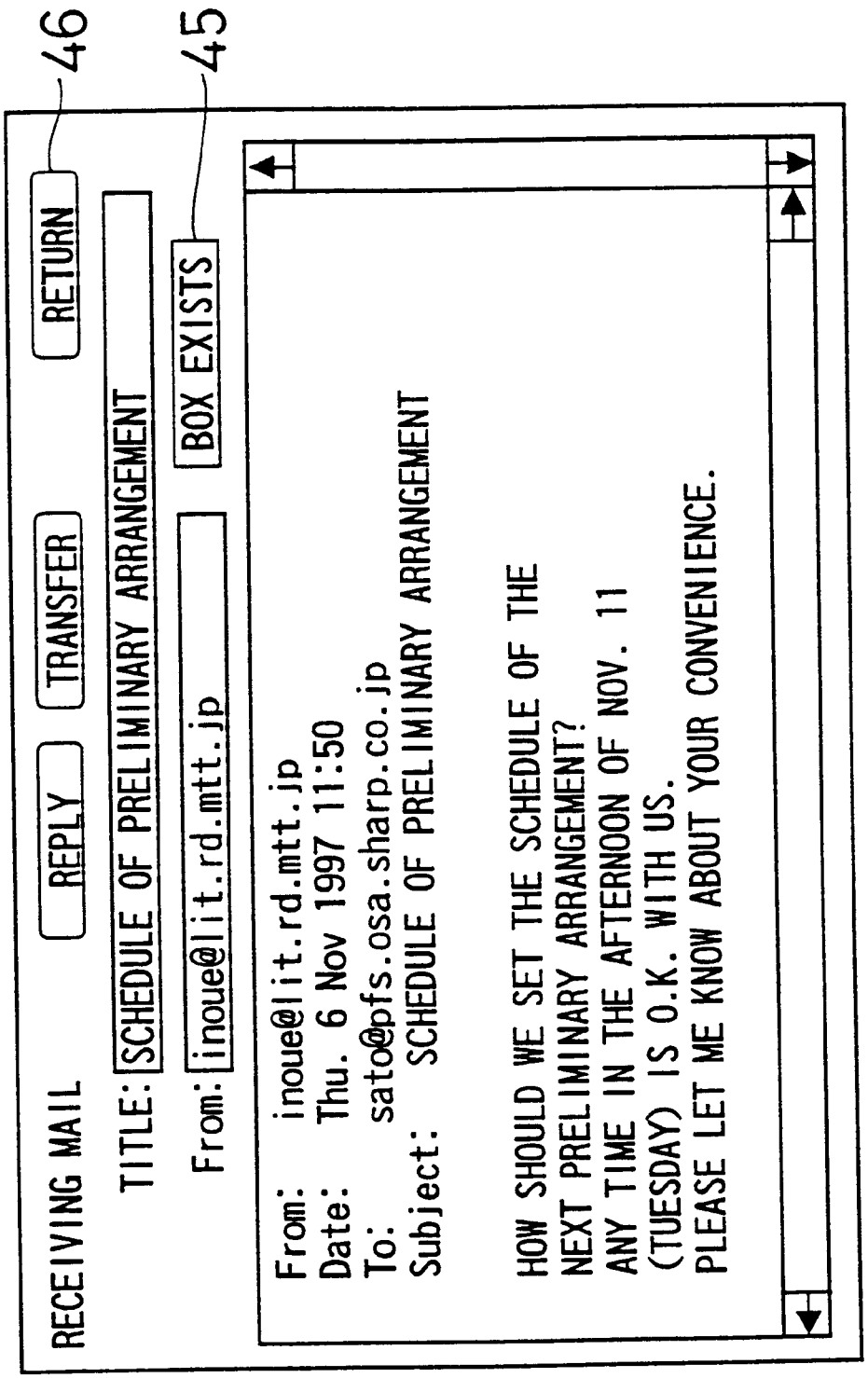
FIG. 16 is a screen on a display in an information processor containing an electronic mail processing system of a second embodiment of the present invention in receiving a mail.

FIG. 16 is a display screen showing the contents of a received mail. When a mail box having a keyword of the name or t he mailing address of the sender of the mail currently displayed has been set, the information processor indicates as MAIL BOX EXISTS 45 as shown in FIG. 16. When the user finishes to read this received mail and touches RETURN button 46 here, the information processor closes the mail receiving screen in FIG. 16 and stores this mail to an appropriate already-read mail box. When no mail box having the keyword of the name or the mailing address of the sender of the mail currently displayed has been set, MAIL BOX EXISTS 45 is not displayed.

Figure 17:
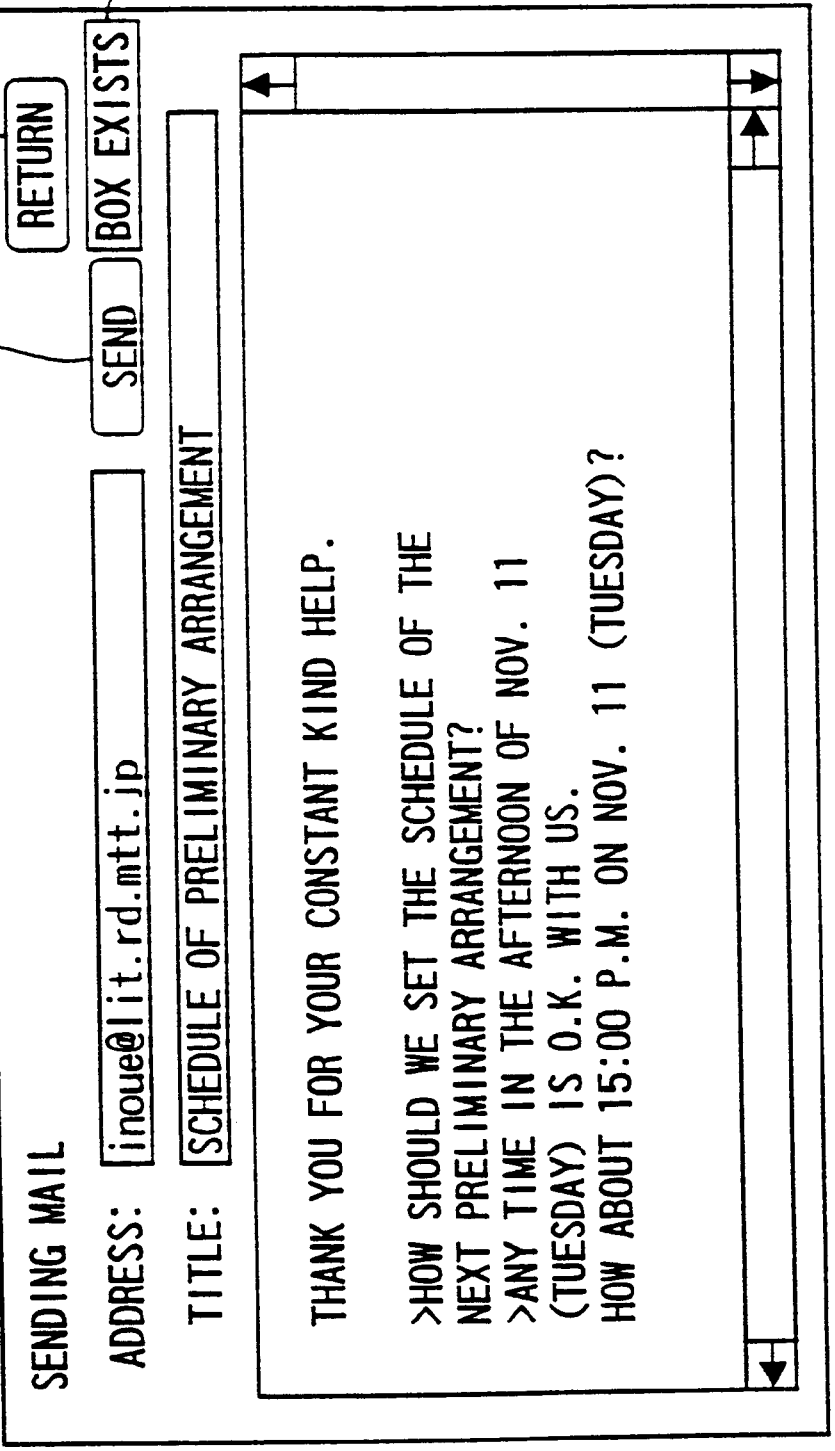
FIG. 17 is a screen on the display in the information processor of the second embodiment in sending a mail.

FIG. 17 is a display screen showing the contents of a mail to be sent. When a mail box having a keyword of the name or the mailing address of the address of the mail currently created has been set, the information processor indicates as MAIL BOX EXISTS 47 as shown in FIG. 17. When the user completes the mail to be sent and touches SENT button 48 here, the information processor closes the mail sending screen in FIG. 17 and stores this mail to an appropriate already-sent mail box. When no mail box having the keyword of the name or the mailing address of the address of the mail currently created has been set, MAIL BOX EXISTS 47 is not displayed.

Next, the above-mentioned processes will be explained further by using flowcharts in FIGS. 18 and 19.

Figure 18:
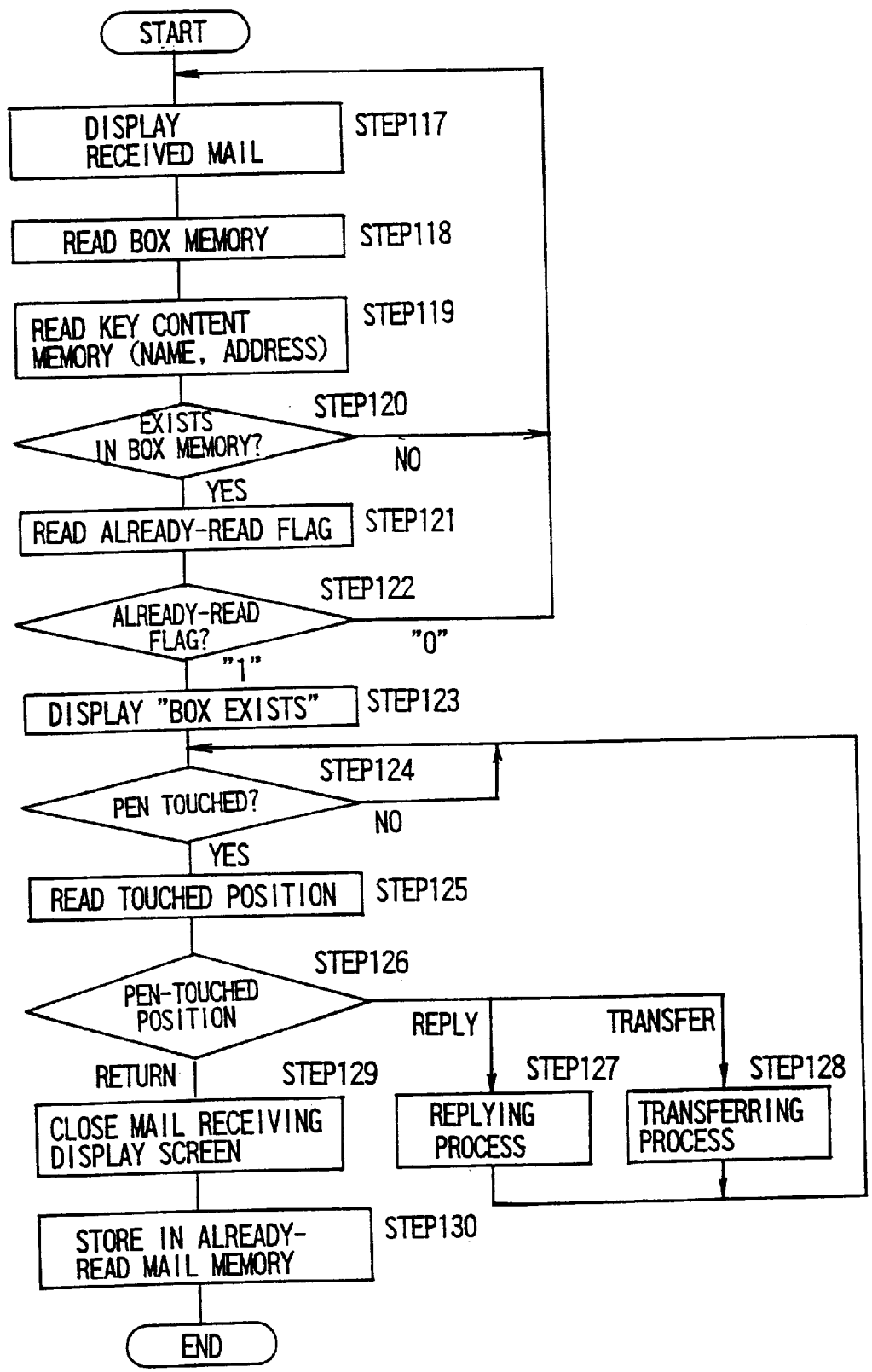
FIG. 18 is a flowchart showing a process of the information processor of the second embodiment in receiving a mail.

FIG. 18 is a flowchart showing the process of the information processor in receiving a mail. In the state in which the mail receiving screen is displayed, the information processor displays the received mail at first in step 117. It then reads the contents of the mail box memory 11-5 from the RAM 11 in step 118 and reads the contents of the key content memory 11-5-4 from the read contents of the mail box memory 11-5 in step 119. It compares the name and mailing address of the sender of the received mail currently displayed with the contents of the key content memory 11-5-4 read in step 119 to judge whether or not the sender of the received mail exists within the mail box memory 11-5 in step 120.

When the address of the received mail does not exist within the mail box memory 11-5, the process returns to step 117. When the address of the sender of the received mail exists within the mail box memory 11-5, the information processor reads the already-read mail box flag 11-5-2 having a keyword of at least the name or the mailing address of the above-mentioned sender in step 121. It then judges the value of the already-read mail box flag 11-5-2 in step 122. When the value of the already-read mail box flag 11-5-2 is "0", the process returns to step 117 and when the value of the already-read mail box flag 11-5-2 is "1", the information processor displays MAIL BOX EXISTS 45 in step 123.

Next, the information processor waits until the user touches the input/output section 2 by the pen in step 124. When the pen touches the input/output section 2, the information processor reads the touched position in step 125 and judges the pen-touched position in step 126. When the pen-touched position is REPLY button 21, the information processor performs the replying process and then ends the process. When the pen-touched position is TRANSFER button 22, the information processor performs the transfer process in step 128 and then ends the process. When the pen-touched position is RETURN button 46, the information processor closes the received mail display screen in step 129, stores the received mail in an area of the mail box having a keyword of at least the name or the mailing address of the sender of the mail in the already-read mail memory 11-5-5 of the mail box memory 11-5 in the RAM 11 in step 130 and then ends the process.

Figure 19:
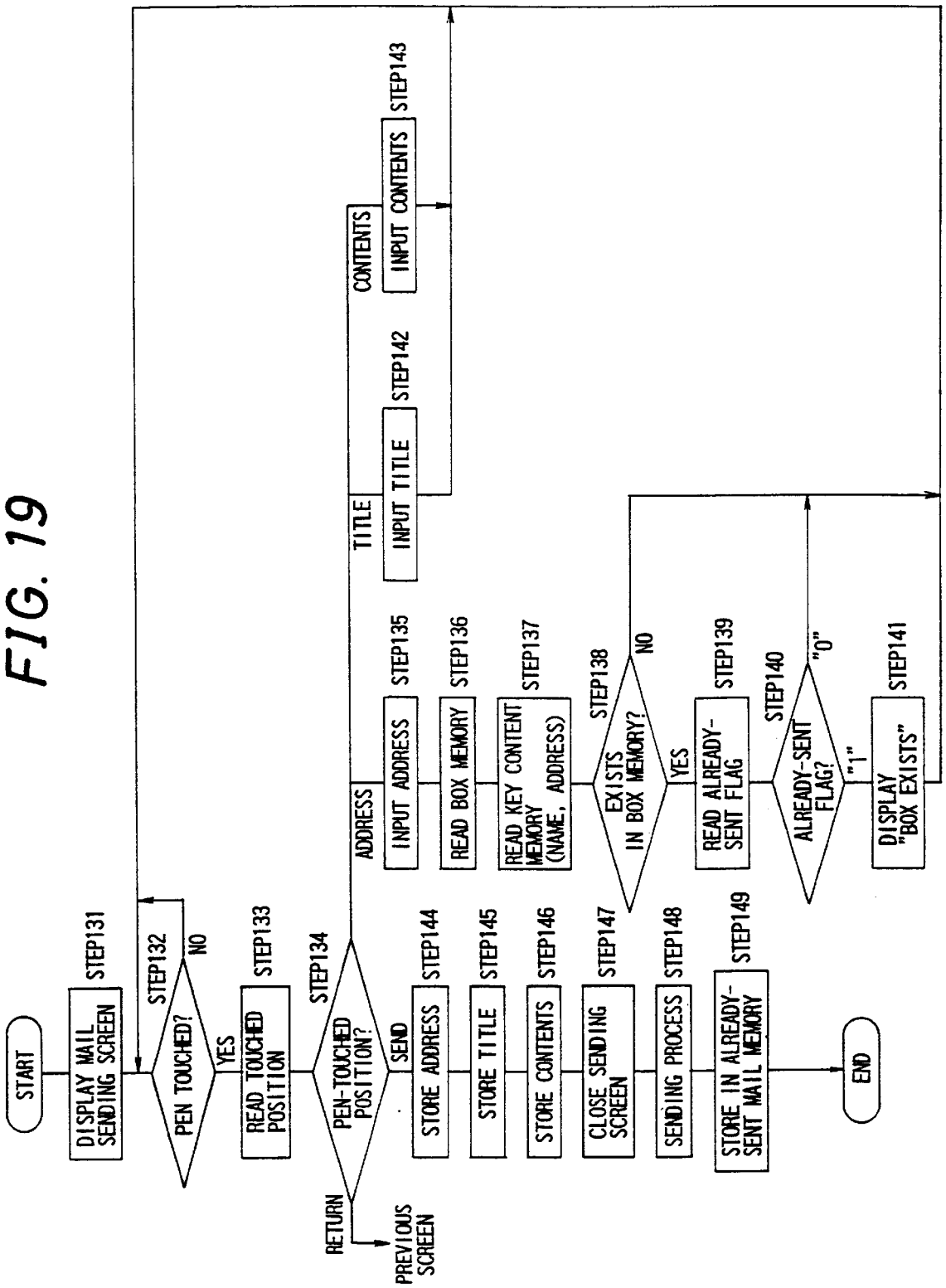
FIG. 19 is a flowchart showing a process of the information processor of the second embodiment in sending a mail.

FIG. 19 is a flowchart showing the process of the information processor in sending a mail. The information processor displays the mail sending screen in step 131 and waits until the user touches the input/output section 2 by the pen in step 132. When the pen touches the input/output section 2, the information processor reads the touched position in step 133 and judges the pen-touched position in step 134. When the pen-touched position is RETURN button 49, the information processor returns the screen to the screen displayed before the mail sending screen has been displayed.

When the pen-touched position is the address inputting section 25 and the mailing address is inputted as the address in step 135, the information processor reads the contents of the mail box memory 11-5 from the RAM 11 in step 136 and reads the contents of the key content memory 11-5-4 from the read contents of the mail box memory 11-5 in step 137.

In step 138, the information processor compares the inputted name and mailing address of the mail to be sent with the contents of the key content memory 11-5-4 read in step 137 to judge whether or not the address of the mail to be sent exists within the mail box memory 11-5. When the address of the mail to be sent does not exist within the mail box memory 11-5, the information processor returns the process to step 132. When the address of the mail to be sent exists within the mail box memory 11-5, the information processor reads the already-sent mail box flag 11-5-1 for the mail box having a keyword of at least the name or the mailing address of the address in step 139. It then judges the value of the already-sent mail box flag 11-5-1 in step 140. When the value of the already-sent mail box flag 11-5-1 is "0", the information processor returns the process to step 132 and when the value of the already-sent mail box flag 11-5-1 is "1", the information processor displays the MAIL BOX EXISTS button 47 in step 141. Then, the process returns to step 132.

When the pen-touched position is the title inputting section 26 in the judgment in step 134 and then the title is inputted in step 142, the process returns to step 132. When the pen-touched position is the content inputting section 27 and then the contents to be sent is inputted in step 143, the process returns to step 132. When the pen-touched position is SEND button 28, the information processor stores the address in step 144, stores the title in step 145 and stores the contents of the mail in step 146. It then closes the mail sending screen in step 147 and performs the sending process in step 148. In the next step 148, the information processor stores this sending mail in an area for the mail box having a keyword of at least the name or the mailing address of the above-mentioned address within the already-sent mail memory 11-5-6 and then ends the process.

The above-mentioned processes allow the already-sent mail or the already-read mail to be stored in the mail box by name or by address in closing the mail receiving screen or when the instruction for sending the mail is issued.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic mail system comprising:
    at least one of sent mail storage means for storing previously sent mail and received mail storage means for storing received mail;
    setting means for setting at least one of a first storage area, for storing previously sent mail within the previously sent mail storage means based upon at least one of an associated name and address, and a second storage area, for storing previously read received mail within the received mail storage means based upon at least one of an associated name and address; and
    instructing means for instructing at least one of previously sent mail and previously read received mail to be stored in a respective at least one of the first and second storage area set by the setting means.

2. An electronic mail system comprising:
    at least one of sent mail storage means for storing previously sent mails and received mail storage means for storing received mail;
    setting means for setting at least one of a first storage area, for storing previously sent mail within the previously sent mail storage means based upon at least one of an associated name and address, and a second storage area, for storing previously read received mail within the received mail storage means based upon at least one of an associated name and address; and
    means for automatically storing at least one of the previously sent mail and the previously read mail in a respective at least one of the first and second storage area set by the setting means.

3. The electronic mail system of claim 1, the electronic mail system further comprising a display, for indicating an existence of at least one of the first storage area for storing the previously sent mail and the second storage area for storing the previously read received mail.

4. The electronic mail system of claim 1, further comprising additional setting means for setting at least one of a third storage area, for storing previously sent mail based upon at least one of an associated name and address with respect to the names and addresses associated with the previously read received mail stored in the second storage area, and a fourth storage area for storing previously read received mail based upon at least one of an associated name and address with respect to the names and addresses of the previously sent mail stored in the first storage area, within at least one of the previously sent mail storage means and the received mail storage means, respectively.

5. A computer readable medium storing an electronic mail control program for causing a computer to control sending and receiving of mail,
    the computer comprising a previously sent mail storage for storing previously sent mail, and a received mail storage for storing received mail,
    the electronic mail control program causing the computer to perform a process for setting at least one of a first storage area, for storing previously sent mail within the previously sent mail storage based upon at least one of an associated name and address and a second storage area, for storing previously read received mail within the received mail storage based upon at least one of an associated name and address, and for causing the computer to perform a process for instructing at least one of the previously sent mail to be stored in the first storage area and the previously read mail to be stored in the second storage area.

6. A computer readable medium storing an electronic mail control program for causing a computer to control mail sending and receiving of mail, the computer comprising a previously sent mail storage for storing previously sent mail, and a received mail storage for storing received mail, the electronic mail control program causing the computer to perform a process for setting at least one of a first storage area, for storing previously sent mail within the previously sent mail storage based upon at least one of an associated name and address and a second storage area, for storing previously read received mail within the received mail storage based upon at least one of an associated name and address, and for causing the computer to perform a process for automatically storing at least one of the previously sent mail in the first storage area and the previously read mail in the second storage area.

7. An electronic mail system comprising:

at least one of an already-sent mail storage unit for storing previously sent mail and a received mail storage unit for storing received mail;

a setting circuit for setting at last one of a first storage area, for storing previously sent mail within the previously sent mail storage unit based upon at least one of an associated name and address, and a second storage area, for storing previously read received mail within the received mail storage unit based upon at least one of an associated name and address; and an instructing circuit for instructing at least one of previously sent mail to be stored in the first storage area, and previously read received mail to be stored in the second storage area, the first and second storage areas being set by the setting circuit.

8. An electronic mail system comprising:

at least one of a previously sent mail storage unit for storing previously sent mail and a received mail storage unit for storing received mail;

a setting circuit for setting at least one of a first storage area, for storing previously sent mail within the previously sent mail storage unit based upon at least one of an associated name and address, and a second storage area, for storing previously read received mail within the received mail storage unit based upon at least one of an associated name and address; and a storage circuit for automatically storing at least one of previously sent mail and the previously read mail in a respective at least one of the first and second storage area set by the setting circuit.

9. The electronic mail system of claim 2, the electronic mail system further comprising a display, for indicating an existence of at least one of the first storage area for storing the previously sent mail and the second storage area for storing the previously read received mail.

10. The electronic mail system of claim 3, further comprising additional setting at least one of means for setting a third storage area, for storing previously sent mail based upon at least one of an associated name and address with respect to the names and addresses associated with the previously read received mail stored in the second storage area and for setting a fourth storage area for storing previously read received mail based upon at least one of an associated name and address with respect to the names and addresses of the previously sent mail stored in the first storage area, within at least one of the previously sent mail storage means and the received mail storage means, respectively.

11. The electronic mail system of claim 1, further comprising:

mail creating means for creating mail;

mail sending means for sending the created mail; and mail receiving means for receiving mail.

12. The electronic mail system of claim 2, further comprising:

mail creating means for creating mail;

mail sending means for sending the created mail; and mail receiving means for receiving mail.

13. The computer readable medium of claim 5, wherein the electronic mail control program further causes the computer to perform a process of creating mail, sending created mail, and receiving mail.

14. The computer readable medium of claim 6, wherein the electronic mail control program further causes the computer to perform a process of creating mail, sending created mail, and receiving mail.

15. The electronic mail system of claim 7, further comprising:

mail creating circuit for creating mail;

mail sending circuit for sending the created mail; and mail receiving circuit for receiving mail.

16. The electronic mail system of claim 8, further comprising:

mail creating circuit for creating mail;

mail sending circuit for sending the created mail; and mail receiving circuit for receiving mail.

17. The electronic mail system of claim 8, the electronic mail system further comprising a display, for indicating an existence of at least one of the first storage area for storing the previously sent mail and the second storage area for storing the previously read received mail.

18. The electronic mail system of claim 3, wherein the display further displays at least one of received mail and mail to be sent, and wherein such a display further includes an indicator, displayed in conjunction with the received or sent mail, indicating the existence of a first or second storage area for a designated recipient or sender.

19. The electronic mail system of claim 17, wherein the display further displays at least one of received mail and mail to be sent, and wherein such a display further includes an indicator, displayed in conjunction with the received or sent mail, indicating the existence of a first or second storage area for a designated recipient or sender.

* * * * *